United States Patent
Kurata

(10) Patent No.: US 6,822,805 B2
(45) Date of Patent: Nov. 23, 2004

(54) OBJECTIVE LENS

(75) Inventor: Kiyonobu Kurata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/295,821

(22) Filed: Nov. 18, 2002

(65) Prior Publication Data

US 2003/0197945 A1 Oct. 23, 2003

Related U.S. Application Data

(63) Continuation-in-part of application No. 10/188,322, filed on Jul. 3, 2002.

(30) Foreign Application Priority Data

Jul. 9, 2001  (JP) ........................................ 2001-208125

(51) Int. Cl.$^7$ .............................................. G02B 21/02
(52) U.S. Cl. ...................................... 359/656; 359/350
(58) Field of Search ................................. 359/656–658, 359/368, 350, 355–357, 754–756

(56) References Cited

U.S. PATENT DOCUMENTS

| | | | | |
|---|---|---|---|---|
| 5,440,422 A | | 8/1995 | Vollrath | 359/355 |
| 5,469,299 A | | 11/1995 | Nagano | 359/661 |
| 5,886,826 A | * | 3/1999 | Amemiya | 359/656 |
| 5,982,559 A | * | 11/1999 | Furutake | 359/656 |
| 6,181,480 B1 | | 1/2001 | Ito | 359/656 |
| 6,392,814 B1 | * | 5/2002 | Ono | 359/661 |
| 6,507,442 B2 | * | 1/2003 | Kashima et al. | 359/656 |
| 2001/0033425 A1 | | 10/2001 | Kashima et al. | |

FOREIGN PATENT DOCUMENTS

| | | |
|---|---|---|
| JP | 05-072482 | 3/1993 |
| JP | 10-104510 | 4/1998 |
| JP | 11-167067 | 6/1999 |
| JP | 11-249025 | 9/1999 |
| JP | 2001-042224 | 2/2001 |

* cited by examiner

Primary Examiner—Jordan M. Schwartz
(74) Attorney, Agent, or Firm—Pillsbury Winthrop LLP

(57) ABSTRACT

An objective lens includes a first lens group, a second lens group having a lens pair, a third lens group having a lens pair, a fourth lens group having a lens pair, a fifth lens group having a lens pair, and a sixth lens group. The objective lens is configured so as to satisfy the following conditional expressions:

$$d/L < 0.025$$

$$0.58 < Rp/Rn < 1.65$$

where L(mm) is the overall length of the objective lens; d(mm) is the air gap of each of the lens pair; Rp is the radius of curvature of each of positive refractive power surfaces opposing each other with the air gap therebetween; and Rn is the radius of curvature of a negative refractive power surface. Whereby, chromatic aberration can be corrected and resolution is exponentially improved without using a cemented lens, providing a deep ultra-violet objective lens with a high NA capable of auto focussing instantaneously.

14 Claims, 14 Drawing Sheets

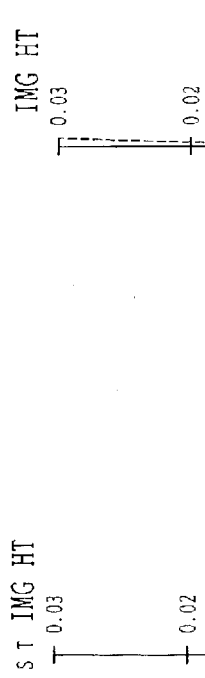
FIG.3A SPHERICAL ABERRATION
FIG.3B CURVATURE OF FIELD
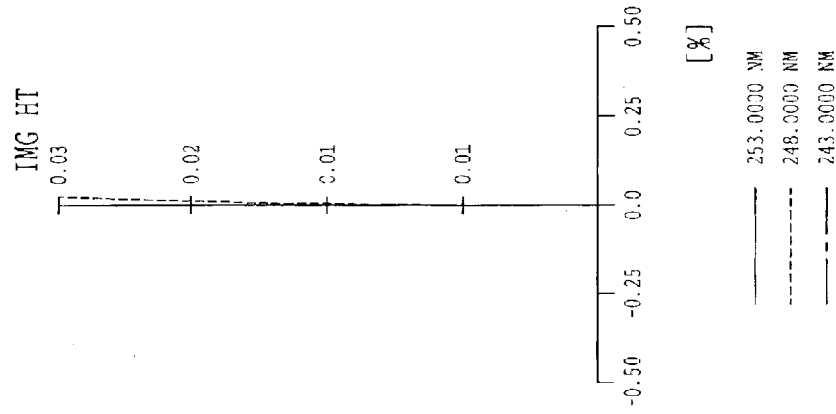
FIG.3C DISTORTION

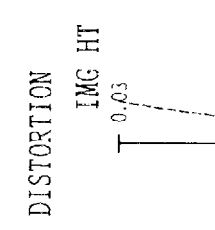

OBJECTIVE LENS

This is a Continuation-In-Part of U.S. application Ser. No. 10/188,322, filed Jul. 3, 2002.

BACKGROUND OF THE INVENTION

1. Field of the Invention

The present invention relates to objective lenses, and in particular relates to an objective lens used in a deep ultraviolet-wavelength region around a wavelength of 250 nm for a high-NA (numerical aperture), high-power, and infinity-correction type microscope.

2. Description of the Related Art

As an objective lens employing a deep ultraviolet region around a wavelength of 250 nm, the following four major types classified thereinto are conventionally known.

A first type objective lens is formed of only a plurality of lenses made from the same medium (silica, mostly) as disclosed in Japanese Unexamined Patent Application Publication No. 6-242381 and Japanese Unexamined Patent Application Publication No. 10-104510, and it cannot correct chromatic aberrations in theory.

A second type objective lens is formed of lenses made from different media (silica and calcium fluorite, mostly) cemented together with an adhesive as disclosed in Japanese Unexamined Patent Application Publication No. 5-72482, Japanese Unexamined Patent Application Publication No. 9-243923, and Japanese Unexamined Patent Application Publication No. 11-249025, and it can correct chromatic aberrations.

Also, a third type objective lens, as disclosed in Japanese Unexamined Patent Application Publication No. 11-167067, uses a lens made from silica and a lens made from calcium fluorite so as to correct chromatic aberrations; however it is structured by not cementing both the lenses together with an adhesive.

Further, a fourth type objective lens, as disclosed in Japanese Unexamined Patent Application Publication No. 2001-42224, is structured by cementing a lens made from silica and a lens made from calcium fluorite together with an adhesive so as to correct chromatic aberrations. Furthermore, the second lens group from the image side is designed to be biconcave, in which its curvature on the image side is apparently smaller than that on the object side, enabling active auto-focusing utilizing a near-infrared wavelength to be performed by moving the condensing position of DUV (deep ultra-violet rays) closer to that of NIR (near-infrared rays).

However, these conventional four types of objective lenses have the following problems.

First, the first type of objective lens cannot correct chromatic aberrations in theory, so that it has a problem that when a light source having a wavelength width (a lamp and an excimer laser being not narrowed in band, etc.) is used, the beam condensing function is extremely reduced by chromatic aberrations so that predetermined resolution defined by a wavelength and numerical aperture cannot be obtained.

The second type of objective lens can correct chromatic aberrations so that it does not have such a problem as that of the first type; however, it has another problem that there are few types of adhesives that are able to suitably transmit deep ultra-violet rays and moreover there are only types with a small bonding strength and present difficulties for being used efficiently. In an objective lens using such adhesive, although there is no problem when light rays of a lamp or the like are incident therein, if light rays with high energy such as laser rays enter the lens, the adhesive is degraded the irradiation with the deep ultra-violet rays, so that reduction in the transmission efficiency of the objective lens is a problem.

Furthermore, the third type of objective lens solves the problems of the two types mentioned above. However, Japanese Unexamined Patent Application Publication No. 11-16067 basically relates to an objective lens for laser repair using deep ultra-violet rays, so that there is only a lens with a numerical aperture of about 0.4 disclosed in its embodiment. Thereby, it is impossible to obtain high resolution by reducing the wavelength. That is, the resolution of a microscope is fundamentally defined by a wavelength and a numerical aperture of the objective lens; the center wavelength of visible light employed in an ordinary microscope is about 550 nm and the maximum numerical aperture of a dry-system objective lens is about 0.9. Therefore, if the wavelength used is around 250 nm, the resolution is doubled because the wavelength is halved; however, it is the case that the numerical aperture is identical first-and-foremost. Even if the wavelength used is around 250, when the numerical aperture is about 0.4, the wavelength is about half while the numerical aperture is also half, so that the resolution is counteracted and is no different from a conventional microscope.

Moreover, the fourth type of objective lens is capable of correcting chromatic aberration and of auto-focusing (AF) by moving the image position of a deep ultra-violet region closer to that of an infrared region up to a point; however, in the same way as in the second type of objective lens, an adhesive is degraded by deep ultra-violet rays so as to have a problem of the reduction in the transmission factor of the objective lens.

SUMMARY OF THE INVENTION

Accordingly, it is an object of the present invention to provide a high-NA deep ultra-violet objective lens by correcting chromatic aberration without using a cemented lens and by exponentially improving the resolution so as to correspond to miniaturization in connection with the progress toward high integration of semiconductors and high-capacity of optical recording media.

It is another object of the present invention to provide a high-NA deep ultra-violet objective lens capable of focusing in a moment of time by enabling the AF.

In order to achieve the above-mentioned objects, in an objective lens according to the present invention having an NA of at least 0.7 and being constituted by combining a plurality of single lenses as a whole, the objective lens comprises a first lens group having a positive meniscus lens with a convex surface facing an image side and a negative biconcave lens, which are arranged in the sequential order from the image side, so as to have negative refractive power as a whole; a second lens group having at least one couple of a lens pair so as to have positive refractive power as a whole by arranging a positive lens and a negative lens, which are made of a medium different from each other, to have an air gap therebetween; a third lens group having four couples of lens pairs so as to have positive refractive power as a whole by arranging a positive lens and a negative lens, which are made of a medium different from each other, to have an air gap therebetween; a fourth lens group having two couples of lens pairs arranged by a positive lens and a negative lens, which are made of a medium different from each other, to have an air gap therebetween; a fifth lens group having one couple of a lens pair so as to have positive refractive power as a whole by arranging a positive lens and a negative lens including a negative meniscus lens with a concave surface facing an object side, which are made of a medium different from each other, to have an air gap therebetween; and a sixth lens group having at least one positive lens and a positive meniscus lens with a concave surface facing the object side so as to have positive refractive power as a whole, wherein the objective lens satisfies the following conditional expressions (1) and (2):

$$d/L < 0.025 \tag{1}$$

$$0.58 < Rp/Rn < 1.65 \tag{2},$$

where L(mm) is the overall length of the objective lens; d(mm) is the air gap of the lens pair; Rp is the radius of curvature of each of positive refractive power surfaces opposing each other with the air gap therebetween; and Rn is the radius of curvature of a negative refractive power surface.

In addition, L in the conditional expression (1) is defined as the overall length of the objective lens; alternatively, if the parfocal distance of the objective lens is substantially the same as the overall length of the objective lens, the parfocal distance of the objective lens may be used as L. Also, the overall length of the objective lens is the distance from the first lens surface to the ultimate lens surface.

Also, an objective lens according to the present invention is characterized by having a lens made from silica and a lens made from calcium fluorite.

Also, an objective lens according to the present invention is characterized by that in at least one lens pair of the second lens group, the third lens group, the fourth lens group, or the fifth lens group, the negative lens has a lens made from silica and the positive lens has a lens made from calcium fluorite.

Also, an objective lens according to the present invention is characterized by that in at least one lens pair of the second lens group, the third lens group, the fourth lens group, and the fifth lens group, the negative lens is constituted of a lens made from silica and the positive lens is constituted of a lens made from calcium fluorite.

Also, an objective lens according to the present invention satisfies the following conditional expression (3):

$$|DUVfp - IRfp| \leq 12 \, \mu m \tag{3}$$

where DUVfp is the image-forming position on an object side of the objective lens by light having a wavelength in a deep ultra-violet region and IRfp is the image-forming position on the object side of the objective lens by light having a wavelength in an infrared region.

Also, in the objective lens according to the present invention, the second lens group has a concave lens and satisfies the following conditional expression (4):

$$Ri < Ro \tag{4},$$

where Ri is the curvature of at least one concave lens on an image side and Ro is the curvature thereof on an object side.

Also, in the objective lens according to the present invention, a parfocal distance is from 30 mm to 105 mm.

Also, in the objective lens according to the present invention, a parfocal distance is from 45 mm to 75 mm.

Also, the objective lens according to the present invention is characterized by that the sum total of central thicknesses of lenses constituting the first lens group is smaller than the space between the first lens group and the second lens group.

Also, in an objective lens according to the present invention having an NA of at least 0.7 and being constituted by combining a plurality of single lenses as a whole, the objective lens comprises a first lens group having a positive meniscus lens with a convex surface facing an image side and a negative biconcave lens, which are arranged in the sequential order from the image side, so as to have negative refractive power as a whole; a second lens group having at least one couple of a lens pair so as to have positive refractive power as a whole, the lens pair having a positive lens and a negative lens, which are made of media different from each other and are arranged to have an air gap therebetween; a third lens group having two units, each unit comprising three lenses including a positive lens and a negative lens, which are made of media different from each other and are arranged to have an air gap therebetween, so as to have positive refractive power as a whole; a fourth lens group having two couples of lens pairs, each couple of the lens pairs having a positive lens and a negative lens, which are made of media different from each other and are arranged to have an air gap therebetween; a fifth lens group having one couple of a lens pair so as to have positive refractive power as a whole, the lens pair having a positive lens and a negative lens including a negative meniscus lens with a concave surface facing an object side, which are made of media different from each other and are arranged to have an air gap therebetween; and a sixth lens group having at least one positive lens and a positive meniscus lens with a concave surface facing the object side so as to have positive refractive power as a whole, wherein the objective lens satisfies the following conditional expressions (1) and (2):

$$d/L < 0.025 \tag{1}$$

$$0.58 < Rp/Rn < 1.65 \tag{2},$$

where L(mm) is the overall length of the objective lens; d(mm) is the air gap of the lens pair; Rp is the radius of curvature of each of positive refractive power surfaces opposing each other with the air gap therebetween; and Rn is the radius of curvature of a negative refractive power surface.

In addition, L in the conditional expression (1) is defined as the overall length of the objective lens; alternatively, if the parfocal distance of the objective lens is substantially the same as the overall length of the objective lens, the parfocal distance of the objective lens may be used as L. Also, the overall length of the objective lens is the distance from the first lens surface to the ultimate lens surface.

An optical apparatus according to the present invention comprises an objective lens, a first illumination unit comprising a light source generating ultra-violet light and an illumination optical system leading the ultra-violet light to the objective lens, and a second illumination unit comprising a light source generating infrared light and an illumination optical system leading the infrared light to the objective lens, wherein a specimen is illuminated with the ultra-violet light and the infrared light through the objective lens, wherein in the objective lens having an NA of at least 0.7 and being constituted by combining a plurality of single lenses as a whole, the objective lens comprises a first lens group having a positive meniscus lens with a convex surface facing an image side and a negative biconcave lens, which are arranged in the sequential order from the image side, so as to have negative refractive power as a whole; a second lens group having at least one couple of a lens pair so as to have positive refractive power as a whole, the lens pair having a positive lens and a negative lens, which are made of media different from each other and are arranged to have an air gap therebetween; a third lens group having four couples of lens pairs so as to have positive refractive power as a whole, each couple of the lens pairs having a positive lens and a negative lens, which are made of media different from each other and are arranged to have an air gap therebetween; a fourth lens group having two couples of lens pairs, each couple of the lens pairs having a positive lens and a negative lens, which are made of media different from each other and arranged to have an air gap therebetween; a fifth lens group having one couple of a lens pair so as to have positive refractive power as a whole, the lens pair having a positive lens and a negative lens including a negative meniscus lens with a concave surface facing an object side, which are made of media different from each other and are arranged to have an air gap therebetween; and a sixth lens group having at least one positive lens and a positive meniscus lens with a concave surface facing the object side so as to have positive refractive power as a whole, and wherein the objective lens satisfies the following conditional expressions (1) and (2):

$$d/L < 0.025 \quad (1)$$

$$0.58 < Rp/Rn < 1.65 \quad (2),$$

where L(mm) is the overall length of the objective lens; d(mm) is the air gap of the lens pair; Rp is the radius of curvature of each of positive refractive power surfaces opposing each other with the air gap therebetween; and Rn is the radius of curvature of a negative refractive power surface.

In addition, L in the conditional expression (1) is defined as the overall length of the objective lens; alternatively, if the parfocal distance of the objective lens is substantially the same as the overall length of the objective lens, the parfocal distance of the objective lens may be used as L. Also, the overall length of the objective lens is the distance from the first lens surface to the ultimate lens surface.

As described above, the objective lens according to the present invention entirely has single lenses without cementing lenses made of different materials with an adhesive. If the objective lens has the structure described in claim 1, while chromatic aberration is corrected, the problems occurring when using the adhesive as described above can be cleared, and moreover, the resolution suitable for a wavelength around 250 nm and a numerical aperture can be obtained. Also, if the following conditional expression (3) is satisfied, the active AF using infrared light is enabled by limiting the range of the image-forming position in a deep ultra-violet region on an object side and the image-forming position in an infrared region within approximately ±12 μm, a deep ultra-violet microscope with higher operability can be provided.

$$|DUVfp - IRfp| \leq 12 \, \mu m \quad (3)$$

where DUVfp is the image-forming position on an object side of the objective lens according to the present invention by light having a wavelength in a deep ultra-violet region and Irfp is the image-forming position on the object side of the objective lens by light having a wavelength in an infrared region.

The first lens group according to the present invention has a positive meniscus lens with a convex surface facing an image side and a negative biconcave lens, which are arranged in the sequential order from the image side, and it has negative refractive power as a whole. Then, while light rays are brought back to parallel light, curvature of field, which is oblique aberration, and coma aberration are corrected by providing the lens with high negative refractive power in the first lens group with a luminous flux reduced to some extent. Also, since several kinds of aberration are not balanced by simply arranging only the lens with negative refractive power, the positive meniscus lens with a convex surface facing an image side and the negative biconcave lens with high refractive power are arranged so as to have the Gaussian surface, so that the oblique aberration including lateral chromatic aberration can be corrected while having a balance as a whole.

Also, the second lens group according to the present invention has at least one couple of a lens pair so as to have positive refractive power as a whole, the lens pair having a positive lens and a negative lens, which are made of media different from each other and are arranged to have an air gap therebetween. This group is provided for reducing the luminous flux leading to the first lens group using the positive refractive power. Furthermore, by providing at least one couple of a lens pair arranged by the positive lens and the negative lens, which are made of the media different from each other, to have the air gap therebetween, several kinds of on-axial and off-axial aberration including chromatic aberration, which are not fully corrected by the third to sixth lens groups, are to be corrected.

Also, the third lens group according to the present invention has four couples of lens pairs so as to have positive refractive power as a whole, each couple of the lens pairs having a positive lens and a negative lens, which are made of media different from each other, to have an air gap therebetween. Since the four couples of lens pairs exist in the third lens group, on-axial chromatic aberration is corrected by each lens pair. If we look at the structure of the third lens group from a different angle, the neighboring three lenses may also be assumed to be the equivalent to cemented three lenses, and it is assumed that there are two couples of the lenses. In this case, the chromatic aberration can be excellently corrected in the same way as the cemented three lenses. In general objective lenses, by using cemented two lenses, chromatic aberration can be corrected as long as the numerical aperture is small. However, for an objective lens with a numerical aperture of 0.7 or more, in particular, on the order of 0.9, it is difficult to correct the chromatic aberration only by the cemented two lenses. Then, even in an objective lens without using the cemented lens as in the present invention, using the pseudo-cemented triplet lens as described above enables the chromatic aberration to be excellently corrected.

The fourth lens group according to the present invention has two couples of lens pairs, each couple having a positive lens and a negative lens, which are made of media different from each other and are arranged to have an air gap therebetween, so that it has the same advantage as that of the cemented triplet lens by forming a pseudo-cemented triplet lens in the same way as in the third lens group, and it corrects the on-axial aberration. Furthermore, the third lens group also contributes to the chromatic aberration in a deep ultra-violet region and a near infrared region, and the image-forming position on the object side of the deep ultra-violet region and the image-forming position on the object side of the near infrared region can be controlled to some extent by changing the positive or negative code of the focal distance of the fourth lens group. Thereby, the image-forming displacement between the image-forming position in the deep ultra-violet region and the image-forming position in the near infrared region used for the AF can be reduced, enabling the AF.

The fifth lens group according to the present invention has one couple of a lens pair, the lens pair having a positive lens and a negative lens including a negative meniscus lens with a concave surface facing an object side, which are made of media different from each other and are arranged to have an air gap therebetween. Thereby, the fifth lens group has the same advantage as that of the cemented two lenses so as to correct the on-axial chromatic aberration. Furthermore, by the negative meniscus lens, it has the advantage of canceling spherical aberration that cannot be fully corrected by the sixth lens group.

The sixth lens group according to the present invention has a positive lens, a plano-convex lens, or a positive meniscus lens with a concave surface facing the object side and a positive meniscus lens with a concave surface facing the object side so as to have positive refractive power as a whole, thereby excellently correcting monochromatic aberration mainly. In an objective lens with a numerical aperture of 0.7 or more, in particular, on the order of 0.9, even the monochromatic aberration cannot be corrected if the angle of light emitted from the object is not reduced; alternatively, it can be corrected if the positive lens, the plano-convex lens, or the positive meniscus lens with a concave surface facing the object side and the positive meniscus lens with a concave surface facing the object side are used so as to gradually reduce the light angle.

The above-mentioned conditional expression (1) is a conditional expression for arranging lenses close to each other; if the upper limit 0.025 of the conditional expression (1) is exceeded, the air gap between the lenses excessively increases, so that the chromatic aberration correction cannot be excellently performed. Furthermore, the above-mentioned conditional expression (2) is a conditional expression for substantially equalizing radii of curvature of surfaces opposing each other of the lens pair defined by Claims 1, 14, and 15 (referred to simply as a lens pair below). Satisfying the conditional expression (2) enables several kinds of aberration including chromatic aberration to be excellently corrected, and if the conditional range is exceeded, the chromatic aberration is especially difficult to be corrected. That is, the above-mentioned conditional expressions (1) and (2) are the conditions for correcting spherical aberration and chromatic aberration by allowing the objective lens to perform a similar pseudo-function of cemented lenses without using an adhesive. It is noted that satisfying the following conditional expression (2') in place of the conditional expression (2) is much preferred:

$$0.6 < Rp/Rn < 1.65 \quad (2')$$

The above-mentioned conditional expression (3) is a conditional expression for showing the displacement between the image-forming positions of a deep ultra-violet region (248±5 nm) on the object side and an infrared region (the wavelength used mainly in a semiconductor laser for an AF is a single-wavelength of 670 to 900 nm.). Light rays emitted from an object enter an objective lens with some numerical aperture so as to be brought to be parallel light in the objective lens so as to focus when passing through an image-forming lens. An optical configuration of the AF for a general microscope, as shown in FIG. 1, is that a dichroic mirror 3 reflecting only near infrared light is arranged at an angle of 45° between an objective lens 1 and an image-forming lens 2. The visible light emitted from the objective lens 1 passes through the dichroic mirror 3 so as to be focussed by the image-forming lens 2 on an observation side. Also near infrared light is reflected by the dichroic mirror 3 so as to focus in an image-forming lens 2' on the AF side. Then, if chromatic aberration does not exist on an axis of the objective lens, the image-forming position on the observation side coincides with the image-forming position on the AF side. In contrast, the light rays emitted from the image-forming positions on the observation side and on the AF side focus at the same position on the object side. Therefore, forming an AF optical system using a conjugated position with an object on the AF side as a basis (a predetermined position) therefor enables the AF by near infrared light to be performed. However, in practice, the chromatic aberration on the axis exists in the objective lens to some extent. Thereby, the image-forming position on the observation side does not coincide with the image-forming position on the AF side. In this case, although the image-forming position on the observation side cannot be changed, on the AF side, movement of the image-forming lens 2' along the optical axial direction enables images to be formed at the predetermined position (a reference position when the chromatic aberration on the axis does not exist).

However, the amount of the chromatic aberration on the axis differs depending on the magnification of the objective lens. That is, the image-forming position by near infrared light differs at every objective lens. Therefore, for one objective lens, even when the image-forming position on the AF side coincides with the above-mentioned predetermined position, if it is replaced with another objective lens, the image-forming position on the AF side does not coincide with the predetermined position. In this case, as described above, for the other objective lens, by moving the image-forming lens 2' for AF again along the optical axial direction, the image-forming position on the AF side is made to coincide with the reference position.

Thus, the image-forming lens on the AF side need to be changed in its position corresponding to the objective lens to be used. However, it is not preferable to increase the displacement because this increases the size of the apparatus. Then, the objective lens according to the present invention prevents the apparatus from being jumboized by satisfying the conditional expression (3) so as to restrain the displacement of the image-forming lens on the AF side. Also, in another objective lens, the displacement between the image-forming positions of visible light and near infrared light may provably be within this range, so that an objective lens is switchable to another to be used.

If the condition of the conditional expression (3) is exceeded, the displacement of the image-forming lens on the AF side excessively increases, so that the displacement cannot be fully corrected with the image-forming lens on the AF side.

If glass materials used for the objective lens according to the present invention are to be silica and calcium fluorite, a high-workability, high-durability, and high-transmissivity objective lens for a deep ultra-violet region around 250 nm can be obtained without using a medium with deliquescence and birefringence.

In each of the second lens group, the third lens group, the fourth lens group, and the fifth lens group of the objective lens according to the present invention, at least one lens pair is used, which is configured by arranging a negative lens and a positive lens, which are made of a medium different from each other, to have an air gap therebetween. Then, as for the lens pair, if the negative lens is made from silica while the positive lens is made from calcium fluorite, several kinds of aberration including chromatic aberration on an axis can be more excellently corrected.

In the objective lens according to the present invention, when the curvature of at least one concave lens on an image side of the second lens group is Ri and the curvature thereof on an object side is Ro, if the following conditional expression (4) other than the conditional expressions (1), (2), and (3) is satisfied, incident light onto a convex lens and the concave lens can be preferably curved, so that several kinds of off-axial aberration including lateral chromatic aberration can be more excellently corrected.

$$Ri<Ro \qquad (4).$$

These and other objects as well as the features and the advantages of the present invention will become apparent from the following detailed description of the preferred embodiments when taken in conjunction with the accompanying drawings.

BRIEF DESCRIPTION OF THE DRAWINGS

FIG. 3(a), FIG. 3(b), and FIG. 3(c) are drawings showing spherical aberration, curvature of field, and distortion of the objective lens according to the first embodiment, respectively.

FIG. 11(a), FIG. 11(b), and FIG. 11(c) are drawings showing spherical aberration, curvature of field, and distortion of the objective lens according to the fifth embodiment, respectively.

DETAILED DESCRIPTION OF THE PREFERRED EMBODIMENTS

Embodiments according to the present invention will be described below with reference to FIGS. 2 to 14. According to all the embodiments of the present invention, the focal length of an objective lens is 1.8 mm and a correction wavelength band in a deep ultra-violet region is 248±5 nm, and when combined with an image-formation lens having a focal length of 180 mm, the objective lens has a field number of $\phi$5.5 mm and the magnification becomes 100 times as. The chromatic aberration is corrected in a range of 248±5 nm so as to enable the lens to be used in combination with a KrF excimer laser not reduced in a wavelength band. Also, because an adhesive is not used therein, the lens has a sufficient resistance against a laser with high energy. Furthermore, combining the lens with a band pass filter having a full width at half maximum of about 7 nm also enables a specimen to be observed by illuminating it with a mercury lamp as a preliminary stage of laser irradiation. Also, suppressing the displacement in the image formation in a deep ultra-violet region and infrared region enables the AF to be performed.

In each embodiment, aberration shown in an aberration chart indicates aberration on an object plane when the simple objective lens is inversely followed, and their units are mm and %. As for spherical aberration, a dotted line indicates the aberration employing a wavelength of 248 nm; a dotted chain line indicates that of 243 nm; and a solid line indicates that of 253 nm.

First Embodiment

Figure 1:
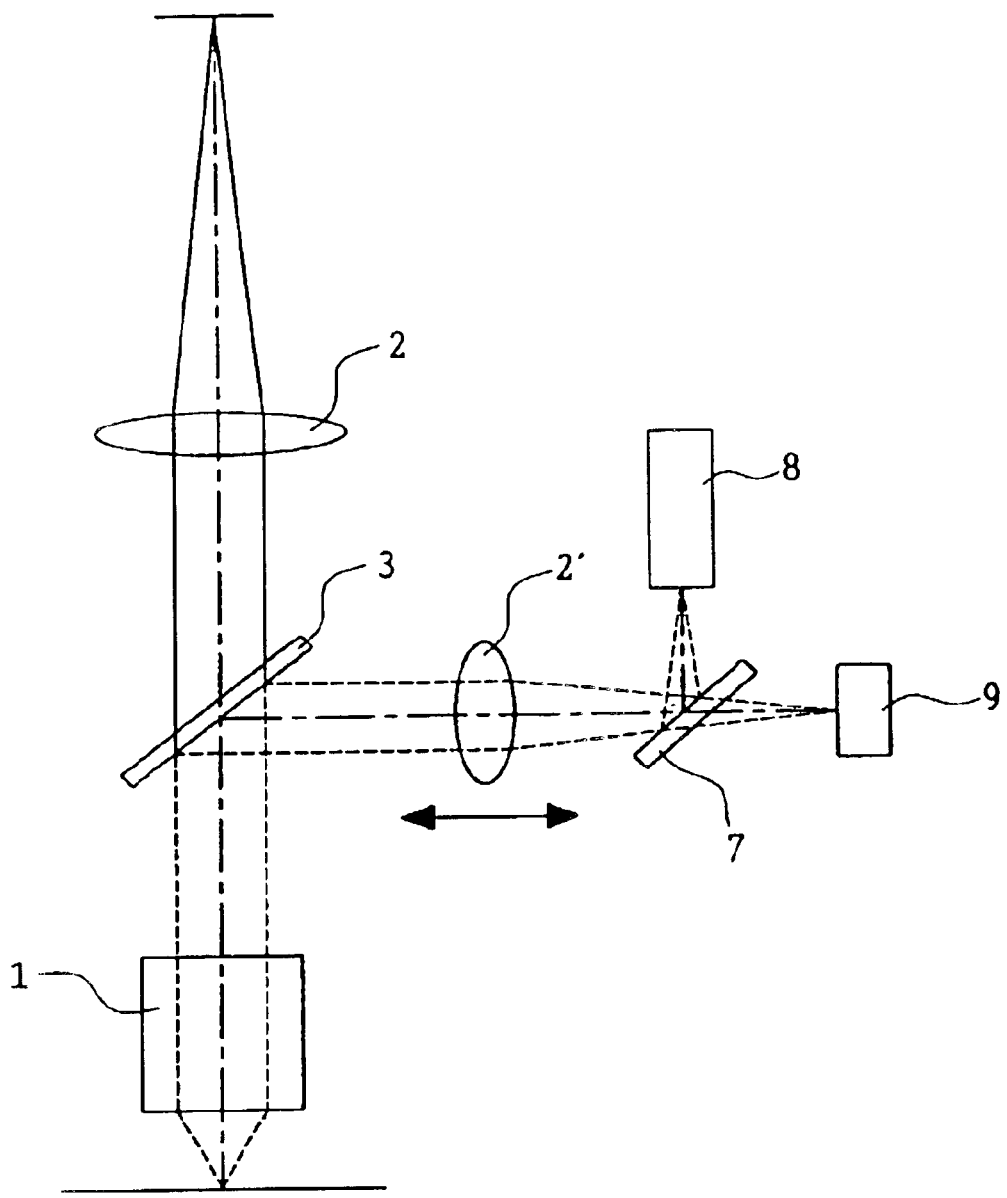
FIG. 1 is a schematic structural drawing showing an optical path relating to AF of a general microscope.
Figure 2:
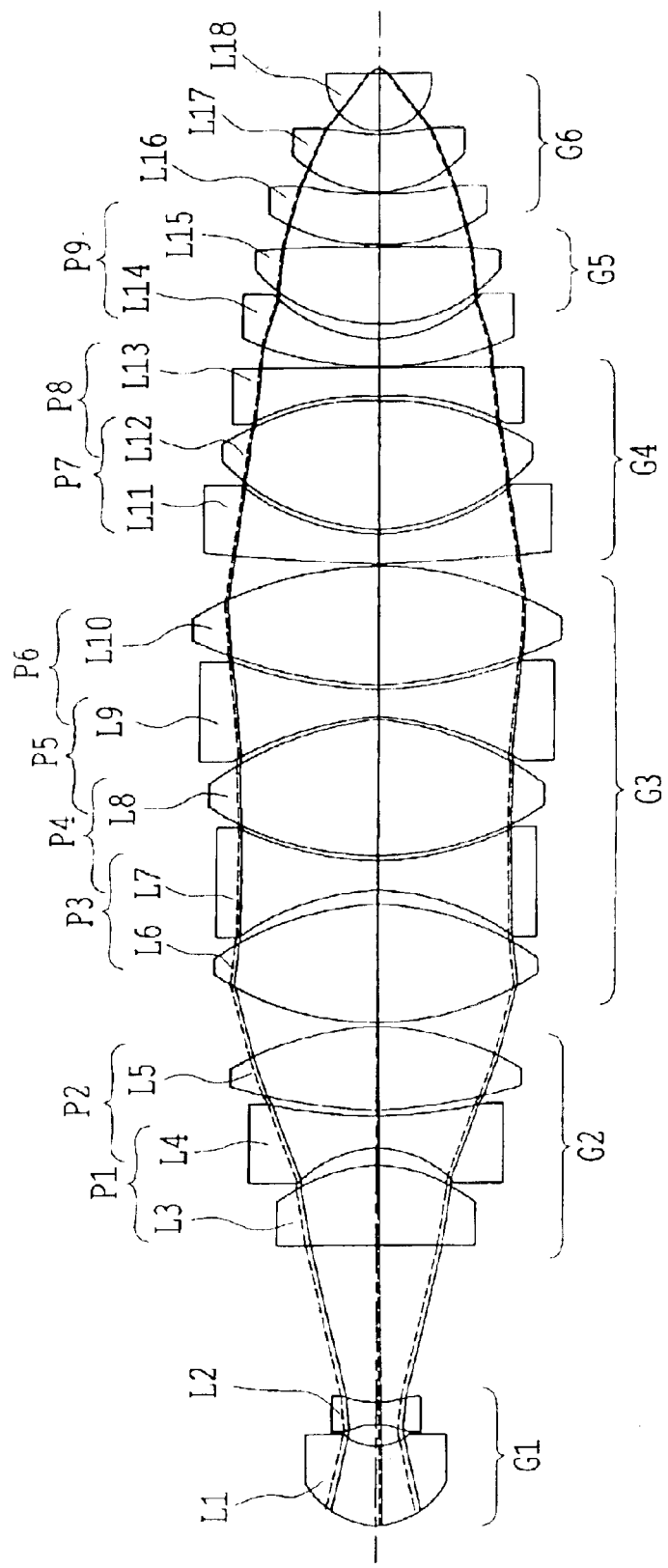
FIG. 2 is a schematic structural drawing of an objective lens according to a first embodiment of the present invention.

FIG. 2 is a schematic structural drawing of an objective lens according to a first embodiment of the present invention; FIG. 3(a) shows spherical aberration of the objective lens according to the first embodiment; FIG. 3(b) shows curvature of field thereof; and FIG. 3(c) shows distortion thereof.

A first lens group G1 according to the embodiment, as shown in FIG. 2, has two lenses of a positive meniscus lens L1 with a convex surface facing the image side and a negative biconcave lens L2, which are arranged in the sequential order from the image side, and it has negative refractive power as a whole.

A second lens group G2 has three lenses L3 to L5 including a concave lens L4, and the neighboring three lenses L3 to L5 constitute two couples of lens pairs P1 and P2 while constitute a pseudo-cemented triplet lens, so that the second lens group G2 has positive refractive power as a whole.

A third lens group G3 has five lenses L6 to L10, and the neighboring five lenses L6 to L10 constitute four couples of lens pairs P3, P4, P5, and P6 while constitute pseudo-cemented triplet lenses, so that the third lens group G3 has positive refractive power as a whole.

A fourth lens group G4 has three lenses L11 to L13, and the neighboring three lenses L11 to L13 constitute two couples of lens pairs P7 and P8 while constitute a pseudo-cemented triplet lens, so that the fourth lens group G4 has positive refractive power as a whole.

A fifth lens group G5 has a negative meniscus lens L14 with a concave surface facing the object side and a positive lens L15, and the neighboring two lenses L14 and L15 constitute a lens pair P9 while constitute a pseudo-cemented doublet lens, so that the fifth lens group G5 has positive refractive power as a whole.

A sixth lens group G6 has three positive meniscus lenses L16, L17, and L18 with concave surfaces facing the object side, so that it has positive refractive power as a whole.

In each couple of the lens pairs P1 to P9 of the second lens group G2, the third lens group G3, the fourth lens group G4, and the fifth lens group G5, the negative lens is constituted of a lens made from silica while the positive lens is constituted of a lens made from calcium fluorite. As shown in the following numerical data 1, the lens pairs P1 to P9 satisfy the above-mentioned conditional expressions (1) and (2) while wavefront aberration image-forming positions on the object side of a deep ultra-violet region and an infrared region also satisfy the above-mentioned conditional expression (3).

Next, numerical data of optical members constituting the objective lens according to the first embodiment are shown. In addition, in the numerical data according to the embodiment, symbol RDY denotes a radius of curvature of each lens surface; symbol THI denotes a thickness or an air gap of each lens; GLA denotes a lens medium; and symbol WD denotes an operating distance.

In addition, these symbols are common to the numerical data in the following embodiments.

Numerical Data 1
Parfocal: 45 mm
Aberration correction range in deep ultraviolet region: 248 nm ± 5 nm
NA: 0.9
WD: 0.2

| Surface | RDY | THI | GLA | | | Condition (1) | Condition (2) |
|---|---|---|---|---|---|---|---|
| 1 | INFINITY | −4.00 | | | | | |
| 2 | 2.526 | 2.53 | Silica | L1 | | | |
| 3 | 2.110 | 0.70 | | | | | |
| 4 | −2.503 | 0.70 | Calcium fluorite | L2 | | | |
| 5 | 3.929 | 5.21 | | | | | |
| 6 | INFINITY | 2.79 | Calcium fluorite | L3 | P1 | | 1.290 |
| 7 | −4.100 | 0.59 | | | | 0.0130 | |
| 8 | −3.179 | 1.00 | Silica | L4 | P2 | | 1.095 |
| 9 | 13.250 | 0.21 | | | | 0.0046 | |
| 10 | 14.513 | 2.79 | Calcium fluorite | L5 | | | |
| 11 | −8.069 | 0.14 | | | | | |
| 12 | 9.175 | 4.02 | Calcium fluorite | L6 | P3 | | 1.191 |
| 13 | −8.107 | 0.47 | | | | 0.0105 | |
| 14 | −6.806 | 1.00 | Silica | L7 | P4 | | 1.036 |
| 15 | 9.394 | 0.21 | | | | 0.0046 | |
| 16 | 9.730 | 4.65 | Calcium fluorite | L8 | P5 | | 0.952 |
| 17 | −7.998 | 0.11 | | | | 0.0023 | |
| 18 | −8.397 | 1.00 | Silica | L9 | P6 | | 0.894 |
| 19 | 13.990 | 0.10 | | | | 0.0022 | |
| 20 | 12.513 | 4.04 | Calcium fluorite | L10 | | | |
| 21 | 10.732 | 0.10 | | | | | |
| 22 | 35.892 | 1.00 | Silica | L11 | P7 | | 1.012 |
| 23 | 6.835 | 0.20 | | | | 0.0045 | |
| 24 | 6.916 | 4.20 | Calcium fluorite | L12 | P8 | | 1.055 |
| 25 | 10.627 | 0.21 | | | | 0.0046 | |
| 26 | −10.072 | 0.96 | Silica | L13 | | | |
| 27 | 101.798 | 0.10 | | | | | |
| 28 | 10.530 | 0.90 | Silica | L14 | P9 | | 1.193 |
| 29 | 4.509 | 0.53 | | | | 0.0117 | |
| 30 | 5.379 | 2.58 | Calcium fluorite | L15 | | | |
| 31 | −51.505 | 0.10 | | | | | |
| 32 | 6.736 | 1.74 | Calcium fluorite | L16 | | | |
| 33 | 17.567 | 0.10 | | | | | |
| 34 | 4.099 | 1.82 | Calcium fluorite | L17 | | | |
| 35 | 9.003 | 0.10 | | | | | |
| 36 | 1.883 | 1.87 | Silica | L18 | | | |
| 37 | 5.293 | 0.26 | | | | | |
| 38 | INFINITY | | | | | | |

| Wavelength used for AF | Image-forming displacement between 248 nm and each wavelength used for AF at the best position of wavefront aberration on the object side |
|---|---|
| 670 nm | +6.12 μm |
| 785 nm | +1.48 μm |
| 900 nm | −4.7 μm |

Second Embodiment

Figure 4:
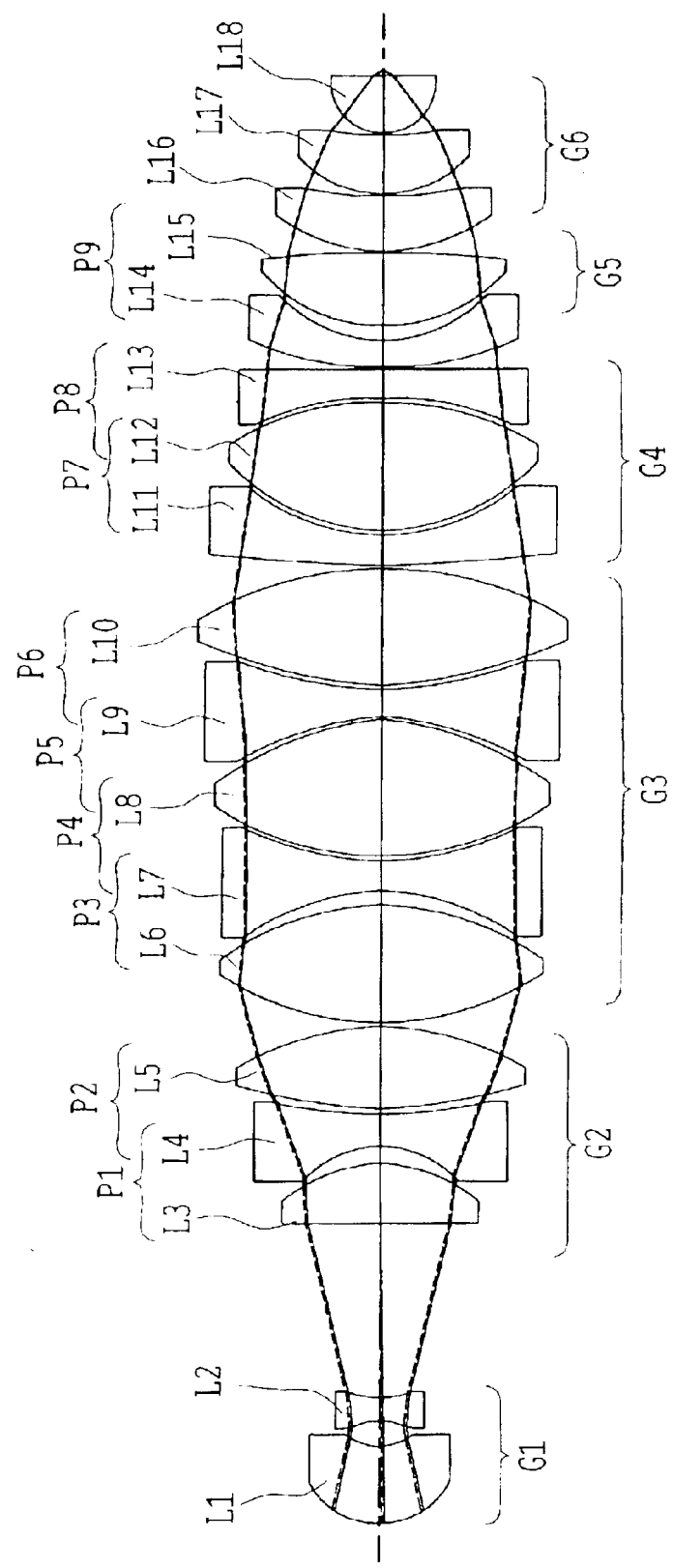
FIG. 4 is a schematic structural drawing of an objective lens according to a second embodiment of the present invention.
Figure 5:
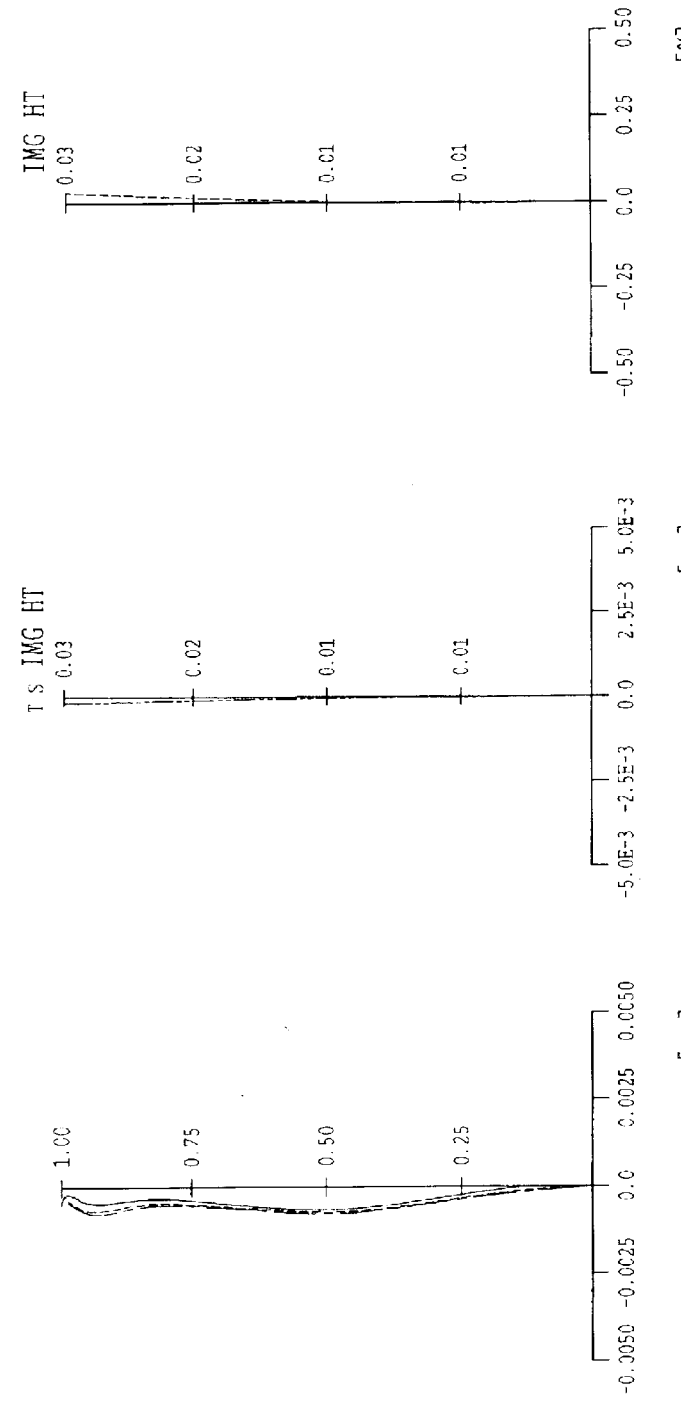
FIG. 5(a), FIG. 5(b), and FIG. 5(c) are drawings showing spherical aberration, curvature of field, and distortion of the objective lens according to the second embodiment, respectively.

FIG. 4 is a schematic structural drawing of an objective lens according to a second embodiment of the present invention; FIG. 5(a) shows spherical aberration of the objective lens according to the second embodiment; FIG. 5(b) shows curvature of field thereof; and FIG. 5(c) shows distortion thereof.

A first lens group G1 according to the embodiment, as shown in FIG. 4, has two lenses of a positive meniscus lens L1 with a convex surface facing the image side and a negative biconcave lens L2, which are arranged in the sequential order from the image side, and it has negative refractive power as a whole.

A second lens group G2 has three lenses L3 to L5 including a concave lens L4, and the neighboring three lenses L3 to L5 constitute two couples of lens pairs P1 and P2 while constitute a pseudo-cemented triplet lens, so that the second lens group G2 has positive refractive power as a whole.

A third lens group G3 has five lenses L6 to L10, and the neighboring five lenses L6 to L10 constitute four couples of lens pairs P3, P4, P5, and P6 while constitute pseudo-cemented triplet lenses, so that the third lens group G3 has positive refractive power as a whole.

A fourth lens group G4 has three lenses L11 to L13, and the neighboring three lenses L11 to L13 constitute two couples of lens pairs P7 and P8 while constitute a pseudo-cemented triplet lens, so that the fourth lens group G4 has positive refractive power as a whole.

A fifth lens group G5 has a negative meniscus lens L14 with a concave surface facing the object side and a positive lens L15, and the neighboring two lenses L14 and L15 constitute a lens pair P9 while constitute a pseudo-cemented doublet lens, so that the fifth lens group G5 has positive refractive power as a whole.

A sixth lens group G6 has three positive meniscus lenses L16, L17, and L18 with concave surfaces facing the object side, so that it has positive refractive power as a whole.

In each couple of the lens pairs P1 to P9 of the second lens group G2, the third lens group G3, the fourth lens group G4, and the fifth lens group G5, the negative lens is constituted of a lens made from silica while the positive lens is constituted of a lens made from calcium fluorite. As shown in the following numerical data 2, the lens pairs P1 to P9 satisfy the above-mentioned conditional expressions (1) and (2) while wavefront aberration image-forming positions on the object side of a deep ultra-violet region and an infrared region also satisfy the above-mentioned conditional expression (3).

Next, numerical data of optical members constituting the objective lens according to the second embodiment are shown.

Numerical Data 2
Parfocal: 45 mm
Aberration correction range in deep ultraviolet region: 248 nm ± 5 nm
NA: 0.9
WD: 0.2

| Surface | RDY | THI | GLA | | | Condition (1) | Condition (2) |
|---|---|---|---|---|---|---|---|
| 1 | INFINITY | −4.00 | | | | | |
| 2 | 2.499 | 2.69 | Silica | L1 | | | |
| 3 | 2.331 | 0.70 | | | | | |
| 4 | −2.524 | 0.66 | Silica | L2 | | | |
| 5 | 2.802 | 5.61 | | | | | |
| 6 | −426.779 | 2.17 | Calcium fluorite | L3 | P1 | | 1.269 |
| 7 | −4.065 | 0.58 | | | | 0.0129 | |
| 8 | −3.202 | 1.01 | Silica | L4 | P2 | | 1.083 |
| 9 | 16.068 | 0.20 | | | | 0.0045 | |
| 10 | 17.407 | 2.75 | Calcium fluorite | L5 | | | |
| 11 | −8.110 | 0.10 | | | | | |
| 12 | 9.505 | 3.98 | Calcium fluorite | L6 | P3 | | 1.198 |
| 13 | −8.284 | 0.50 | | | | 0.0110 | |
| 14 | −6.914 | 1.00 | Silica | L7 | P4 | | 0.951 |
| 15 | 11.515 | 0.10 | | | | 0.0022 | |
| 16 | 10.956 | 4.57 | Calcium fluorite | L8 | P5 | | 1.013 |
| 17 | −8.060 | 0.20 | | | | 0.0044 | |
| 18 | −7.960 | 1.00 | Silica | L9 | P6 | | 0.912 |
| 19 | 14.294 | 0.10 | | | | 0.0022 | |
| 20 | 13.042 | 4.14 | Calcium fluorite | L10 | | | |
| 21 | −10.640 | 0.10 | | | | | |
| 22 | 32.287 | 1.00 | Silica | L11 | P7 | | 1.011 |
| 23 | 6.970 | 0.20 | | | | | |
| 24 | 7.044 | 4.39 | Calcium fluorite | L12 | P8 | | 1.048 |
| 25 | −10.470 | 0.20 | | | | 0.0045 | |
| 26 | −9.989 | 0.96 | Silica | L13 | | | |
| 27 | 257.297 | 0.10 | | | | | |
| 28 | 11.119 | 0.90 | Silica | L14 | P9 | | 1.166 |
| 29 | 4.649 | 0.50 | | | | 0.0112 | |
| 30 | 5.421 | 2.58 | Calcium fluorite | L15 | | | |
| 31 | −43.577 | 0.10 | | | | | |
| 32 | 6.480 | 1.74 | Calcium fluorite | L16 | | | |
| 33 | 12.120 | 0.10 | | | | | |
| 34 | 3.752 | 1.83 | Calcium fluorite | L17 | | | |
| 35 | 6.943 | 0.10 | | | | | |
| 36 | 1.909 | 1.87 | Silica | L18 | | | |
| 37 | 4.682 | 0.27 | | | | | |
| 38 | INFINITY | | | | | | |

| Wavelength used for AF | Image-forming displacement between 248 nm and each wavelength used for AF at the best position of wavefront aberration on the object side |
|---|---|
| 670 nm | +9.59 μm |
| 785 nm | +4.96 μm |
| 900 nm | −1.32 μm |

Third Embodiment

Figure 6:
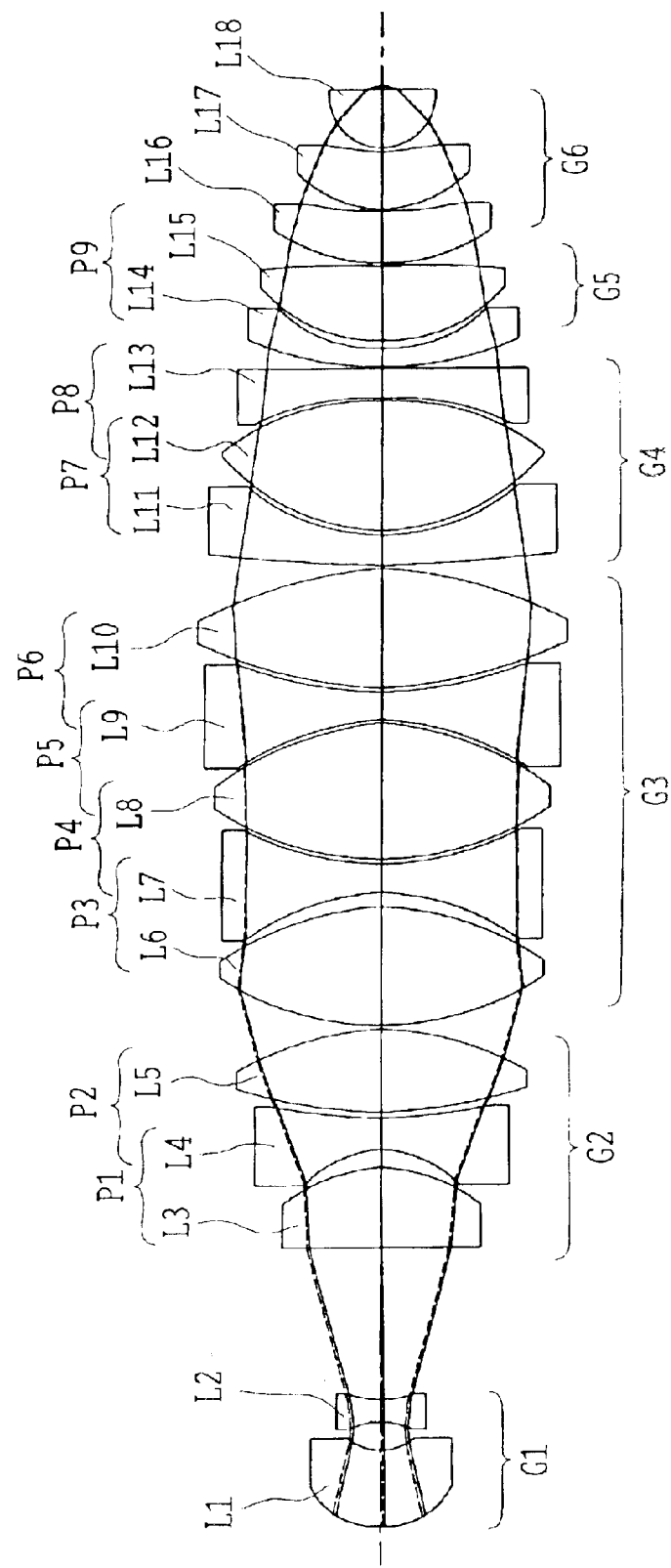
FIG. 6 is a schematic structural drawing of an objective lens according to a third embodiment of the present invention.
Figure 7:
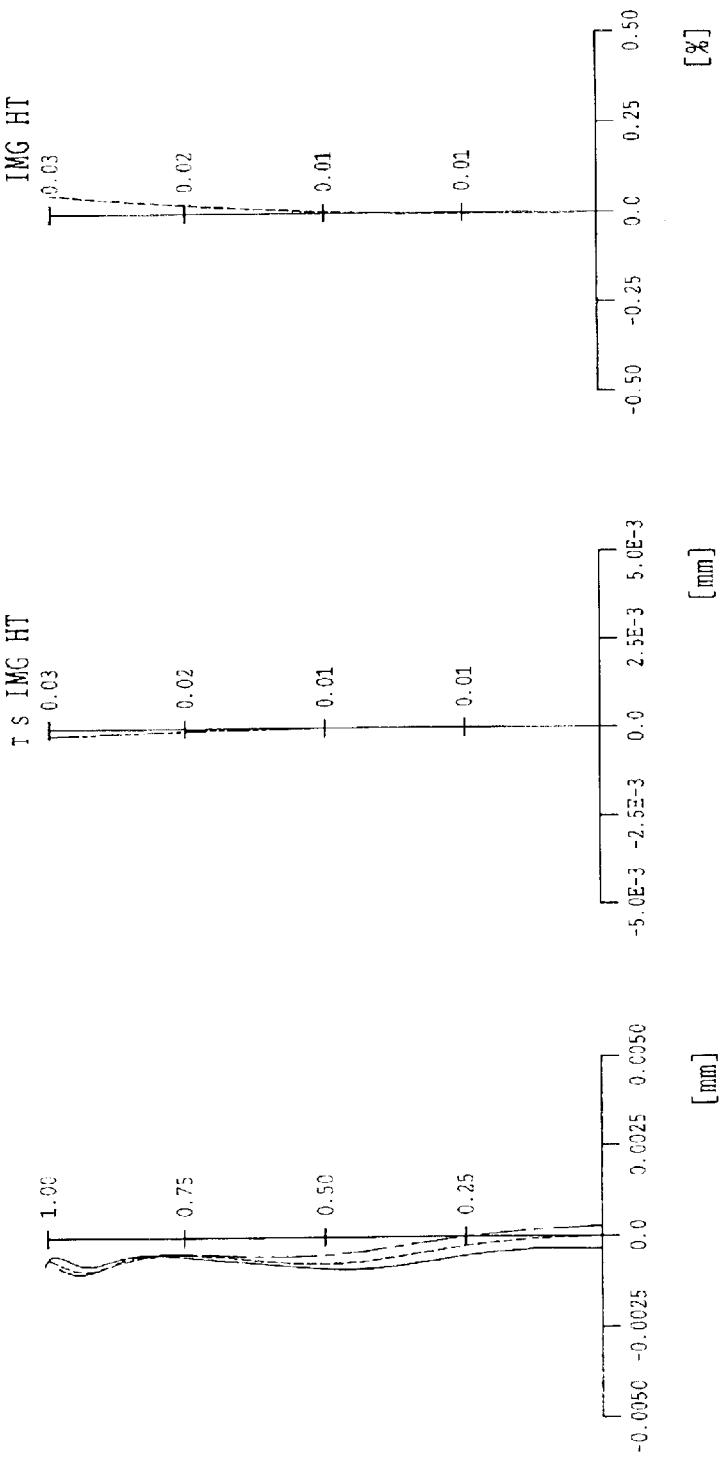
FIG. 7(a), FIG. 7(b), and FIG. 7(c) are drawings showing spherical aberration, curvature of field, and distortion of the objective lens according to the third embodiment, respectively.

FIG. 6 is a schematic structural drawing of an objective lens according to a third embodiment of the present invention; FIG. 7(a) shows spherical aberration of the objective lens according to the third embodiment; FIG. 7(b) shows curvature of field thereof; and FIG. 7(c) shows distortion thereof.

A first lens group G1 according to the embodiment, as shown in FIG. 6, has two lenses of a positive meniscus lens L1 with a convex surface facing an image side and a negative biconcave lens L2, which are arranged in the sequential order from the image side, and it has negative refractive power as a whole.

A second lens group G2 has three lenses L3 to L5 including a concave lens L4, and the neighboring three lenses L3 to L5 constitute two couples of lens pairs P1 and P2 while constitute a pseudo-cemented triplet lens, so that the second lens group G2 has positive refractive power as a whole.

A third lens group G3 has five lenses L6 to L10, and the neighboring five lenses L6 to L10 constitute four couples of lens pairs P3, P4, P5, and P6 while constitute pseudo-cemented triplet lenses, so that the third lens group G3 has positive refractive power as a whole.

A fourth lens group G4 has three lenses L11 to L13, and the neighboring three lenses L11 to L13 constitute two couples of lens pairs P7 and P8 while constitute a pseudo-cemented triplet lens, so that the fourth lens group G4 has negative refractive power as a whole.

A fifth lens group G5 has a negative meniscus lens L14 with a concave surface facing the object side and a positive lens L15, and the neighboring two lenses L14 and L15 constitute a lens pair P9 while constitute a pseudo-cemented douplet lens, so that the fifth lens group G5 has positive refractive power as a whole.

A sixth lens group G6 has three positive lenses with concave surfaces facing the object side, so that it has positive refractive power as a whole.

In each couple of the lens pairs P1 to P9 of the second lens group G2, the third lens group G3, the fourth lens group G4, and the fifth lens group G5, the negative lens is constituted of a lens made from silica while the positive lens is constituted of a lens made from calcium fluorite. As shown in the following numerical data 3, the lens pairs P1 to P9 satisfy the above-mentioned conditional expressions (1) and (2) while wavefront aberration image-forming positions on the object side of a deep ultra-violet region and an infrared region also satisfy the above-mentioned conditional expression (3).

Next, numerical data of optical members constituting the objective lens according to the third embodiment are shown.

Numerical Data 3
Parfocal: 45 mm
Aberration correction range in deep ultraviolet region: 248 nm ± 5 nm
NA: 0.9
WD: 0.2

| Surface | RDY | THI | GLA | | | Condition (1) | Condition (2) |
|---|---|---|---|---|---|---|---|
| 1 | INFINITY | −4.00 | | | | | |
| 2 | 2.496 | 2.69 | Silica | L1 | | | |
| 3 | 2.418 | 0.82 | | | | | |
| 4 | −2.299 | 0.66 | Silica | L2 | | | |
| 5 | 2.936 | 5.51 | | | | | |
| 6 | 2722.214 | 2.17 | Calcium fluorite | L3 | P1 | | 1.270 |
| 7 | −3.960 | 0.57 | | | | 0.0127 | |
| 8 | −3.118 | 1.01 | Silica | L4 | P2 | | 1.073 |
| 9 | 14.995 | 0.20 | | | | 0.0044 | |
| 10 | 16.088 | 2.75 | Calcium fluorite | L5 | | | |
| 11 | −7.926 | 0.10 | | | | | |
| 12 | 8.475 | 3.98 | Calcium fluorite | L6 | P3 | | 1.213 |
| 13 | −8.753 | 0.47 | | | | 0.0105 | |
| 14 | −7.219 | 1.00 | Silica | L7 | P4 | | 1.030 |
| 15 | 8.794 | 0.20 | | | | 0.0044 | |
| 16 | 9.061 | 4.57 | Calcium fluorite | L8 | P5 | | 0.988 |
| 17 | −7.793 | 0.10 | | | | 0.0022 | |
| 18 | −7.886 | 1.00 | Silica | L9 | P6 | | 0.922 |
| 19 | 12.013 | 0.10 | | | | 0.0022 | |
| 20 | 11.073 | 4.14 | Calcium fluorite | L10 | | | |
| 21 | −11.196 | 0.10 | | | | | |

-continued

| | | | | | | | |
|---|---|---|---|---|---|---|---|
| 22 | 45.342 | 1.00 | Silica | L11 | P7 | | 1.014 |
| 23 | 6.501 | 0.20 | | | | 0.0044 | |
| 24 | 6.592 | 4.39 | Calcium fluorite | L12 | P8 | | 1.047 |
| 25 | −9.218 | 0.20 | | | | 0.0044 | |
| 26 | −8.802 | 0.96 | Silica | L13 | | | |
| 27 | 67.692 | 0.10 | | | | | |
| 28 | 8.797 | 0.90 | Silica | L14 | P9 | | 1.187 |
| 29 | 4.506 | 0.52 | | | | 0.0115 | |
| 30 | 5.351 | 2.58 | Calcium fluorite | L15 | | | |
| 31 | −69.280 | 0.10 | | | | | |
| 32 | 6.678 | 1.74 | Calcium fluorite | L16 | | | |
| 33 | 17.761 | 0.10 | | | | | |
| 34 | 4.110 | 1.83 | Calcium fluorite | L17 | | | |
| 35 | 9.169 | 0.10 | | | | | |
| 36 | 1.817 | 1.87 | Silica | L18 | | | |
| 37 | 4.546 | 0.27 | | | | | |
| 38 | INFINITY | | | | | | |

| Wavelength used for AF | Image-forming displacement between 248 nm and each wavelength used for AF at the best position of wavefront aberration on the object side |
|---|---|
| 670 nm | +0.73 μm |
| 785 nm | −4.4 μm |
| 900 nm | −11.0 μm |

Fourth Embodiment

Figure 8:
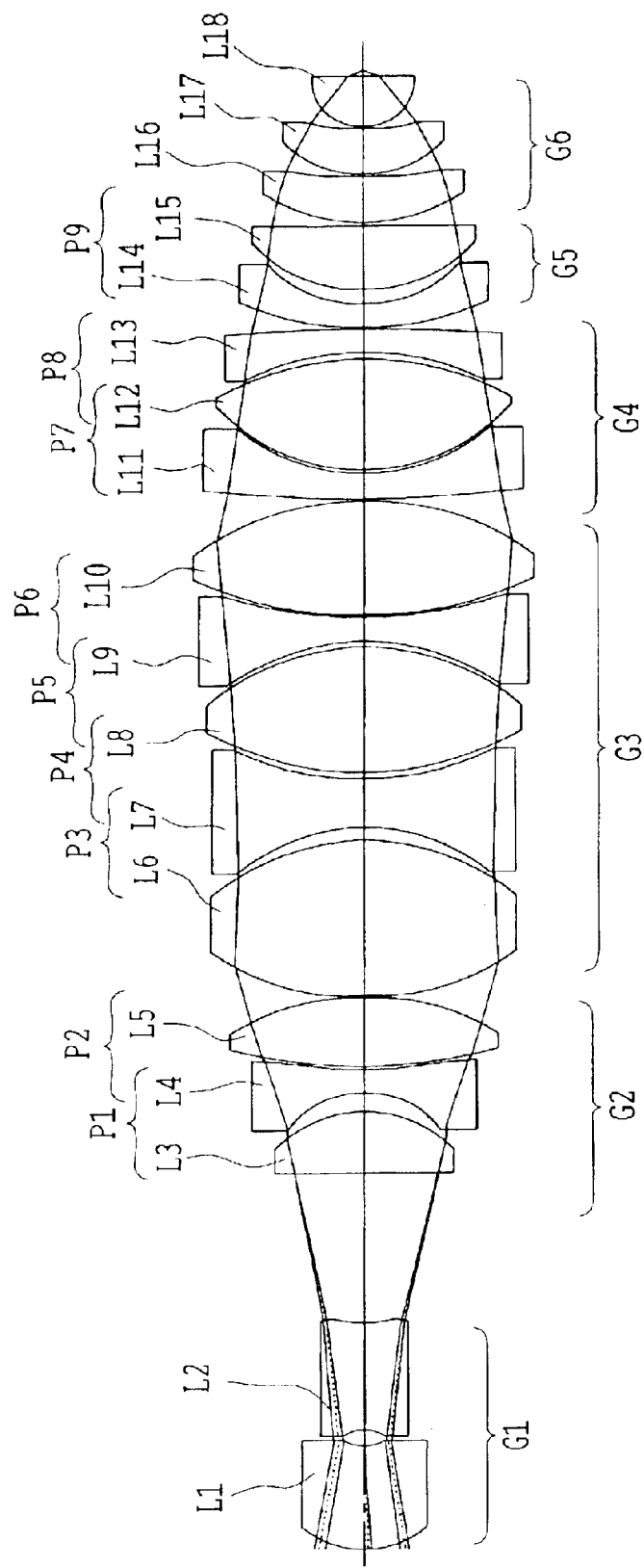
FIG. 8 is a schematic structural drawing of an objective lens according to a fourth embodiment of the present invention.
Figure 9:
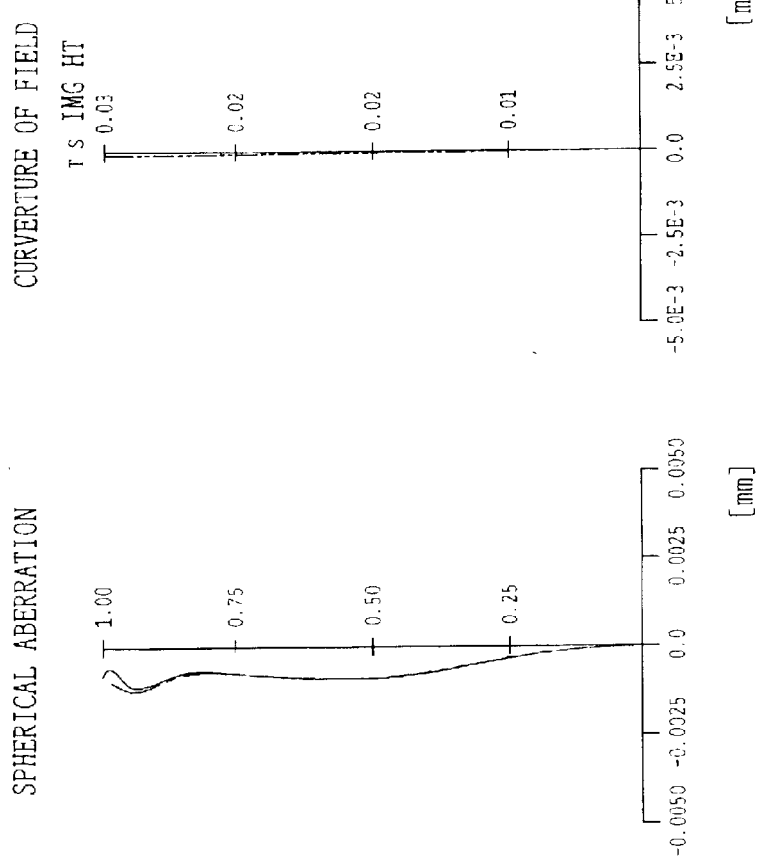
FIG. 9(a), FIG. 9(b), and FIG. 9(c) are drawings showing spherical aberration, curvature of field, and distortion of the objective lens according to the fourth embodiment, respectively.

FIG. 8 is a schematic structural drawing of an objective lens according to a fourth embodiment of the present invention; FIG. 9(a) shows spherical aberration of the objective lens according to the fourth embodiment; FIG. 9(b) shows curvature of field thereof; and FIG. 9(c) shows distortion thereof.

A first lens group G1 according to the embodiment, as shown in FIG. 8, has two lenses of a positive meniscus lens L1 with a convex surface facing an image side and a negative biconcave lens L2, which are arranged in the sequential order from the image side, and it has negative refractive power as a whole.

A second lens group G2 has three lenses L3 to L5 including a concave lens L4, and the neighboring three lenses L3 to L5 constitute two couples of lens pairs P1 and P2 while constitute a pseudo-cemented triplet lens, so that the second lens group G2 has positive refractive power as a whole.

A third lens group G3 has five lenses L6 to L10, and the neighboring five lenses L6 to L10 constitute four couples of lens pairs P3, P4, P5, and P6 while constitute pseudo-cemented triplet lenses, so that the third lens group G3 has positive refractive power as a whole.

A fourth lens group G4 has three lenses L11 to L13, and the neighboring three lenses L11 to L13 constitute two couples of lens pairs P7 and P8 while constitute a pseudo-cemented triplet lens, so that the fourth lens group G4 has positive refractive power as a whole.

A fifth lens group G5 has a negative meniscus lens L14 with a concave surface facing the object side and a positive lens L15, and the neighboring two lenses L14 and L15 constitute a lens pair P9 while constitute a pseudo-cemented douplet lens, so that the fifth lens group G5 has positive refractive power as a whole.

A sixth lens group G6 has three positive lenses with concave surfaces facing the object side, so that it has positive refractive power as a whole.

In each couple of the lens pairs P1 to P9 of the second lens group G2, the third lens group G3, the fourth lens group G4, and the fifth lens group G5, the negative lens is constituted of a lens made from silica while the positive lens is constituted of a lens made from calcium fluorite. As shown in the following numerical data 4, the lens pairs P1 to P9 satisfy the above-mentioned conditional expressions (1) and (2) while wavefront aberration image-forming positions on the object side of a deep ultra-violet region and an infrared region also satisfy the above-mentioned conditional expression (3).

Next, numerical data of optical members constituting the objective lens according to the forth embodiment are shown.

Numerical Data 4
Parfocal: 60 mm
Aberration correction range in deep ultraviolet region: 248 nm ± 5 nm
NA: 0.9
WD: 0.2

| Surface | RDY | THI | GLA | | | Condition (1) | Condition (2) |
|---|---|---|---|---|---|---|---|
| 1 | INFINITY | 0.00 | | | | | |
| 2 | 3.220 | 4.20 | Silica | L1 | | | |
| 3 | 2.260 | 0.70 | | | | | |
| 4 | −2.050 | 4.20 | Calcium fluorite | L2 | | | |
| 5 | 7.140 | 6.04 | | | | | |
| 6 | −48.600 | 2.41 | Calcium fluorite | L3 | P1 | | 1.264 |
| 7 | −4.350 | 0.74 | | | | 0.0124 | |
| 8 | −3.440 | 1.00 | Silica | L4 | P2 | | 1.066 |
| 9 | 17.970 | 0.20 | | | | 0.0033 | |
| 10 | 19.160 | 2.75 | Calcium fluorite | L5 | | | |
| 11 | −9.070 | 0.10 | | | | | |
| 12 | 9.240 | 6.39 | Calcium fluorite | L6 | P3 | | 1.180 |
| 13 | −8.330 | 0.47 | | | | 0.0079 | |
| 14 | −7.060 | 2.16 | Silica | L7 | P4 | | 1.035 |
| 15 | 10.480 | 0.21 | | | | 0.0035 | |
| 16 | 10.850 | 5.13 | Calcium fluorite | L8 | P5 | | 1.029 |
| 17 | −8.180 | 0.22 | | | | 0.0036 | |
| 18 | −7.950 | 1.07 | Silica | L9 | P6 | | 0.870 |
| 19 | 16.070 | 0.05 | | | | 0.0008 | |
| 20 | 13.980 | 4.68 | Calcium fluorite | L10 | | | |
| 21 | −10.320 | 0.10 | | | | | |
| 22 | 44.970 | 1.00 | Silica | L11 | P7 | | 1.019 |
| 23 | 6.940 | 0.22 | | | | 0.0036 | |
| 24 | 7.070 | 4.49 | Calcium fluorite | L12 | P8 | | 1.057 |
| 25 | −11.020 | 0.21 | | | | 0.0036 | |
| 26 | −10.430 | 0.96 | Silica | L13 | | | |
| 27 | −90.510 | 0.10 | | | | | |
| 28 | 11.300 | 0.90 | Silica | L14 | P9 | | 1.202 |
| 29 | 4.540 | 0.58 | | | | 0.0097 | |
| 30 | 5.460 | 2.61 | Calcium fluorite | L15 | | | |
| 31 | −210.580 | 0.10 | | | | | |
| 32 | 6.430 | 1.82 | Calcium fluorite | L16 | | | |
| 33 | 16.520 | 0.10 | | | | | |
| 34 | 3.960 | 1.87 | Calcium fluorite | L17 | | | |
| 35 | 7.910 | 0.10 | | | | | |
| 36 | 1.950 | 1.87 | Silica | L18 | | | |
| 37 | 5.670 | 0.26 | | | | | |
| 38 | INFINITY | | | | | | |

| Wavelength used for AF | Image-forming displacement between 248 nm and each wavelength used for AF at the best position of wavefront aberration on the object side |
|---|---|
| 670 nm | +4.95 μm |
| 785 nm | +0.04 μm |
| 900 nm | −6.45 μm |

Fifth Embodiment

Figure 10:
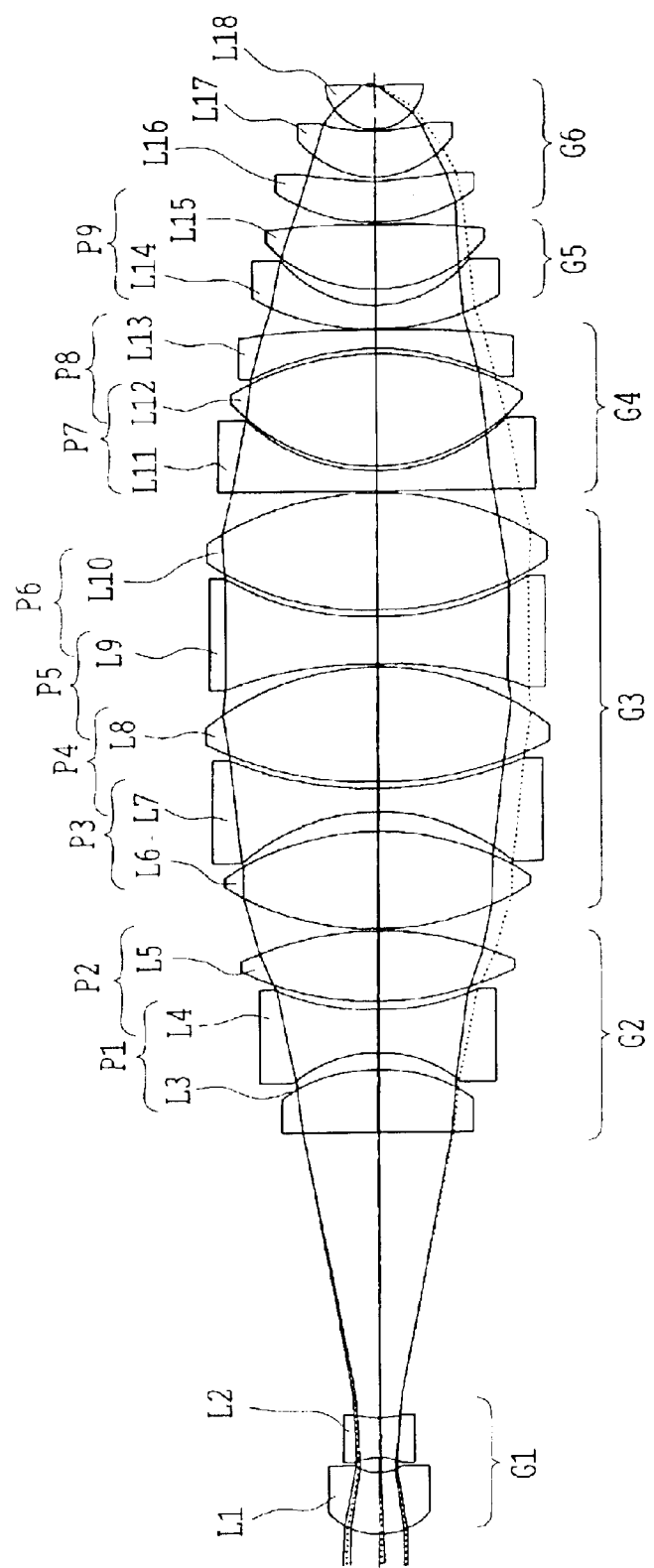
FIG. 10 is a schematic structural drawing of an objective lens according to a fifth embodiment of the present invention.

FIG. 10 is a schematic structural drawing of an objective lens according to a fifth embodiment of the present invention; FIG. 10(a) shows spherical aberration of the objective lens according to the fifth embodiment; FIG. 10(b) shows curvature of field thereof; and FIG. 10(c) shows distortion thereof.

A first lens group G1 according to the embodiment, as shown in FIG. 10, has two lenses of a positive meniscus lens L1 with a convex surface facing an image side and a negative biconcave lens L2, which are arranged in the sequential order from the image side, and it has negative refractive power as a whole.

A second lens group G2 has three lenses L3 to L5 including a concave lens L4, and the neighboring three lenses L3 to L5 constitute two couples of lens pairs P1 and P2 while constitute a pseudo-cemented triplet lens, so that the second lens group G2 has positive refractive power as a whole.

A third lens group G3 has five lenses L6 to L10, and the neighboring five lenses L6 to L10 constitute four couples of lens pairs P3, P4, P5, and P6 while constitute pseudo-cemented triplet lenses, so that the third lens group G3 has positive refractive power as a whole.

A fourth lens group G4 has three lenses L11 to L13, and the neighboring three lenses L11 to L13 constitute two couples of lens pairs P7 and P8 while constitute a pseudo-cemented triplet lens, so that the fourth lens group G4 has negative refractive power as a whole.

A fifth lens group G5 has a negative meniscus lens L14 with a concave surface facing the object side and a positive lens L15, and the neighboring two lenses L14 and L15 constitute a lens pair P9 while constitute a pseudo-cemented doublet lens, so that the fifth lens group G5 has positive refractive power as a whole.

A sixth lens group G6 has three positive lenses with concave surfaces facing the object side, so that it has positive refractive power as a whole.

In each couple of the lens pairs P1 to P9 of the second lens group G2, the third lens group G3, the fourth lens group G4, and the fifth lens group G5, the negative lens is constituted of a lens made from silica while the positive lens is constituted of a lens made from calcium fluorite. As shown in the following numerical data 5, the lens pairs P1 to P9 satisfy the above-mentioned conditional expressions (1) and (2) while wavefront aberration image-forming positions on the object side of a deep ultra-violet region and an infrared region also satisfy the above-mentioned conditional expression (3).

Next, numerical data of optical members constituting the objective lens according to the fifth embodiment are shown.

Numerical Data 5
Parfocal: 75 mm
Aberration correction range in deep ultraviolet region: 248 nm ± 5 nm
NA: 0.95
WD: 0.2

| Surface | RDY | THI | GLA | | | Condition (1) | Condition (2) |
|---|---|---|---|---|---|---|---|
| 1 | INFINITY | 0.27 | | | | | |
| 2 | 2.999 | 3.49 | Silica | L1 | | | |
| 3 | 2.601 | 0.70 | | | | | |
| 4 | -2.257 | 2.21 | Calcium fluorite | L2 | | | |
| 5 | 7.833 | 14.27 | | | | | |
| 6 | 89.945 | 3.81 | Calcium fluorite | L3 | P1 | | 1.378 |
| 7 | -7.157 | 0.90 | | | | 0.0120 | |
| 8 | -5.196 | 2.06 | Silica | L4 | P2 | | 1.252 |
| 9 | 11.625 | 0.46 | | | | 0.0061 | |
| 10 | 14.552 | 3.53 | Calcium fluorite | L5 | | | |
| 11 | -13.950 | 0.10 | | | | | |
| 12 | 13.156 | 5.02 | Calcium fluorite | L6 | P3 | | 1.308 |
| 13 | -11.858 | 0.92 | | | | 0.0123 | |
| 14 | -9.065 | 1.23 | Silica | L7 | P4 | | 1.071 |
| 15 | 17.345 | 0.30 | | | | 0.0040 | |
| 16 | 18.583 | 6.37 | Calcium fluorite | L8 | P5 | | 0.591 |
| 17 | -11.733 | 0.10 | | | | 0.0013 | |
| 18 | -19.866 | 1.62 | Silica | L9 | P6 | | 1.025 |
| 19 | 15.029 | 0.30 | | | | 0.0040 | |
| 20 | 15.409 | 6.34 | Calcium fluorite | L10 | | | |
| 21 | -14.071 | 0.10 | | | | | |
| 22 | -285.035 | 1.00 | Silica | L11 | P7 | | 1.016 |
| 23 | 9.294 | 0.22 | | | | 0.0029 | |
| 24 | 9.444 | 5.80 | Calcium fluorite | L12 | P8 | | 1.060 |
| 25 | -14.005 | 0.30 | | | | 0.0040 | |
| 26 | -13.218 | 0.98 | Silica | L13 | | | |
| 27 | -95.141 | 0.10 | | | | | |
| 28 | 12.218 | 1.21 | Silica | L14 | P9 | | 1.259 |
| 29 | 5.923 | 0.85 | | | | 0.0113 | |
| 30 | 7.454 | 3.24 | Calcium fluorite | L15 | | | |
| 31 | -32.832 | 0.10 | | | | | |
| 32 | 9.475 | 2.14 | Calcium fluorite | L16 | | | |
| 33 | 20.470 | 0.10 | | | | | |
| 34 | 4.085 | 2.26 | Calcium fluorite | L17 | | | |
| 35 | 6.056 | 0.10 | | | | | |
| 36 | 2.380 | 2.21 | Silica | L18 | | | |
| 37 | 6.474 | 0.27 | | | | | |
| 38 | INFINITY | | | | | | |

| Wavelength used for AF | Image-forming displacement between 248 nm and each wavelength used for AF at the best position of wavefront aberration on the object side |
|---|---|
| 670 nm | +6.24 μm |
| 785 nm | +0.52 μm |
| 900 nm | -7.06 μm |

Sixth Embodiment

Figure 12:
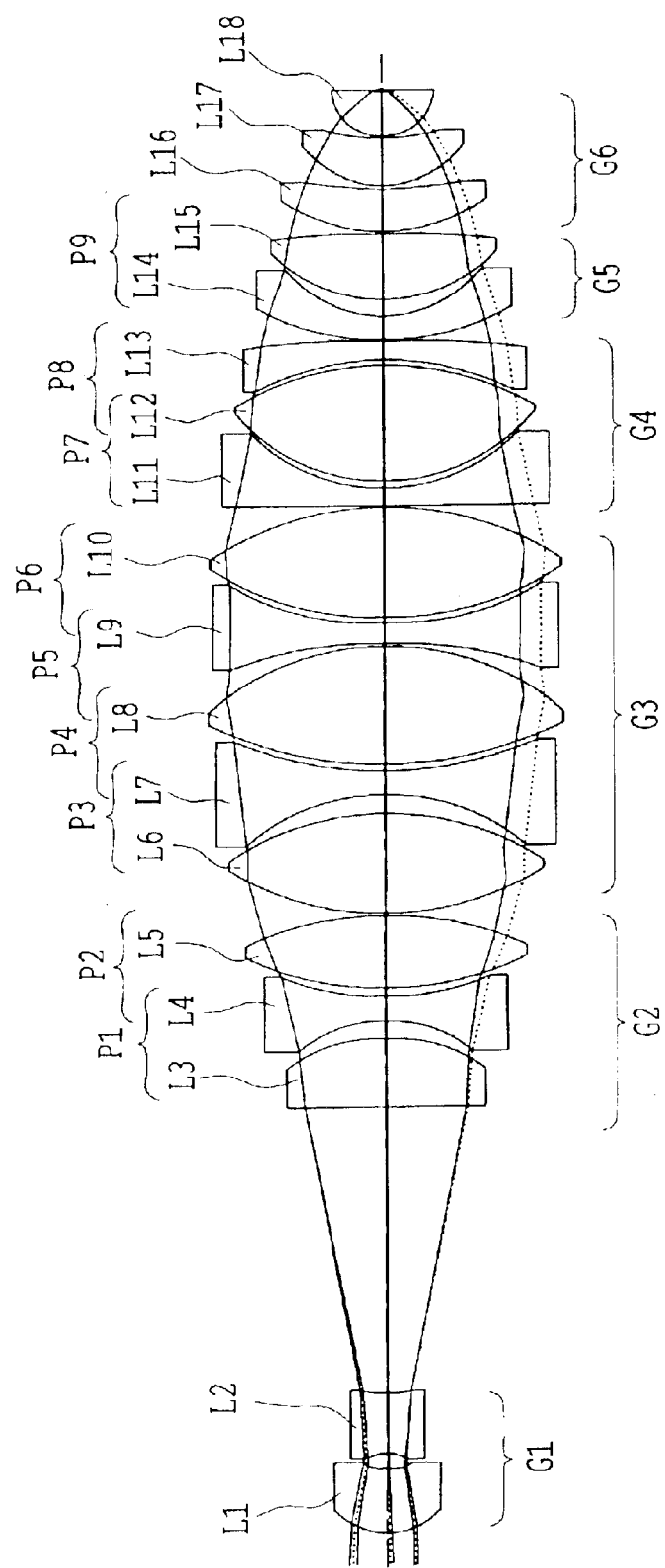
FIG. 12 is a schematic structural drawing of an objective lens according to a sixth embodiment of the present invention.
Figure 13:
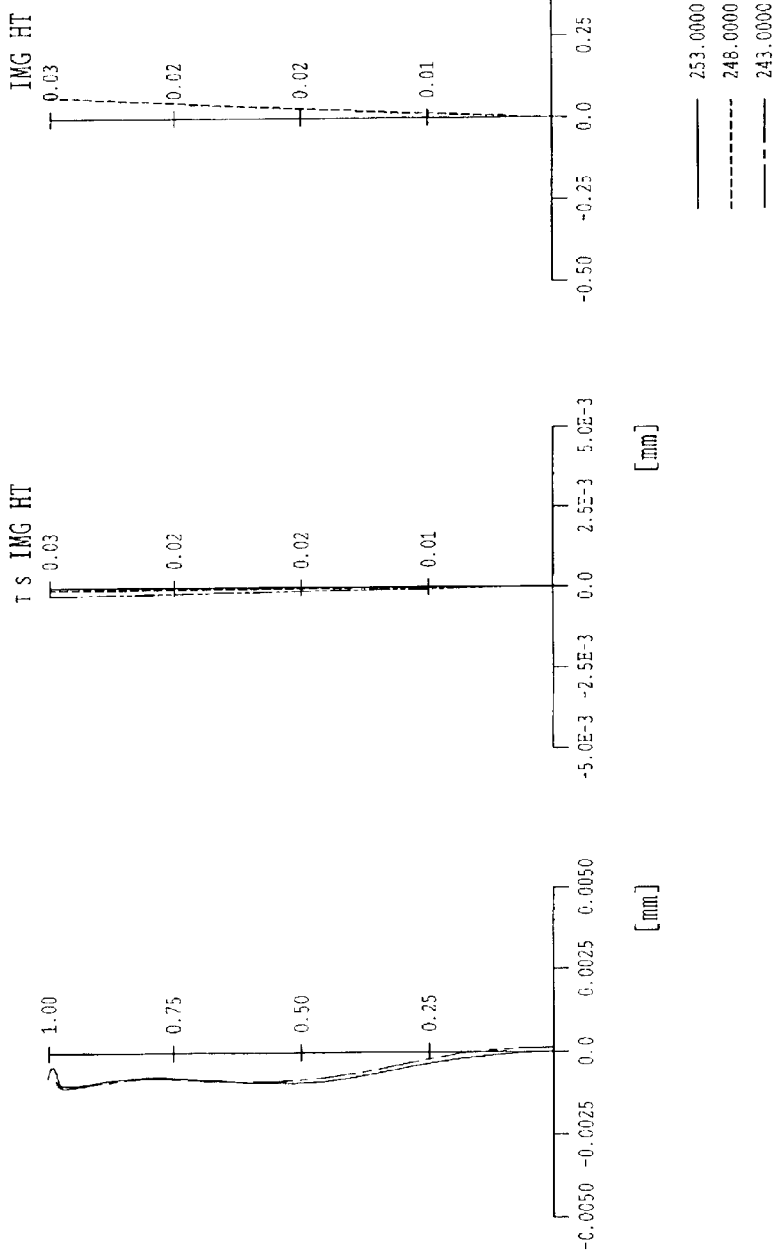
FIG. 13(a), FIG. 13(b), and FIG. 13(c) are drawings showing spherical aberration, curvature of field, and distortion of the objective lens according to the sixth embodiment, respectively.

FIG. 12 is a schematic structural drawing of an objective lens according to a sixth embodiment of the present invention; FIG. 13(a) shows spherical aberration of the objective lens according to the sixth embodiment; FIG. 13(b) shows curvature of field thereof; and FIG. 13(c) shows distortion thereof.

A first lens group G1 according to the embodiment, as shown in FIG. 12, has two lenses of a positive meniscus lens L1 with a convex surface facing an image side and a negative biconcave lens L2, which are arranged in the sequential order from the image side, and it has negative refractive power as a whole.

A second lens group G2 has three lenses L3 to L5 including a concave lens L4, and the neighboring three lenses L3 to L5 constitute two couples of lens pairs P1 and P2 while constitute a pseudo-cemented triplet lens, so that the second lens group G2 has positive refractive power as a whole.

A third lens group G3 has five lenses L6 to L10, and the neighboring five lenses L6 to L10 constitute four couples of lens pairs P3, P4, P5, and P6 while constitute pseudo-cemented triplet lenses, so that the third lens group G3 has positive refractive power as a whole.

A fourth lens group G4 has three lenses L11 to L13, and the neighboring three lenses L11 to L13 constitute two couples of lens pairs P7 and P8 while constitute a pseudo-cemented triplet lens, so that the fourth lens group G4 has negative refractive power as a whole.

A fifth lens group G5 has a negative meniscus lens L14 with a concave surface facing the object side and a positive lens L15, and the neighboring two lenses L14 and L15 constitute a lens pair P9 while constitute a pseudo-cemented doublet lens, so that the fifth lens group G5 has positive refractive power as a whole.

A sixth lens group G6 has three positive lenses with concave surfaces facing the object side, so that it has positive refractive power as a whole.

In each couple of the lens pairs P1 to P9 of the second lens group G2, the third lens group G3, the fourth lens group G4, and the fifth lens group G5, the negative lens is constituted of a lens made from silica while the positive lens is constituted of a lens made from calcium fluorite. As shown in the following numerical data 6, the lens pairs P1 to P9 satisfy the above-mentioned conditional expressions (1) and (2) while wavefront aberration image-forming positions on the object side of a deep ultra-violet region and an infrared region also satisfy the above-mentioned conditional expression (3).

Numerical Data 6
Parfocal: 75 mm
Aberration correction range in deep ultraviolet region: 248 nm ± 5 nm
NA: 0.9
WD: 0.4

| Surface | RDY | THI | GLA | | | Condition (1) | Condition (2) |
|---|---|---|---|---|---|---|---|
| 1 | INFINITY | 1.55 | | | | | |
| 2 | 2.956 | 3.35 | Silica | L1 | | | |
| 3 | 2.560 | 0.71 | | | | | |
| 4 | −2.266 | 3.13 | Calcium fluorite | L2 | | | |
| 5 | 7.900 | 14.18 | | | | | |
| 13 | −8.330 | 0.47 | | | | 0.0079 | |
| 14 | −7.060 | 2.16 | Silica | L7 | P4 | | 1.035 |
| 15 | 10.480 | 0.21 | | | | 0.0035 | |
| 16 | 10.850 | 5.13 | Calcium fluorite | L8 | P5 | | 1.029 |
| 6 | 96.867 | 3.56 | Calcium fluorite | L3 | P1 | | 1.394 |
| 7 | −7.356 | 0.93 | | | | 0.0124 | |
| 8 | −5.278 | 1.26 | Silica | L4 | P2 | | 1.253 |
| 9 | 11.645 | 0.48 | | | | 0.0065 | |
| 10 | 14.597 | 3.75 | Calcium fluorite | L5 | | | |
| 11 | −13.845 | 0.11 | | | | | |
| 12 | 13.179 | 5.16 | Calcium fluorite | L6 | P3 | | 1.303 |
| 13 | −11.920 | 0.95 | | | | 0.0127 | |
| 14 | −9.147 | 1.22 | Silica | L7 | P4 | | 1.067 |
| 15 | 17.384 | 0.33 | | | | 0.0044 | |
| 16 | 18.543 | 6.09 | Calcium fluorite | L8 | P5 | | 0.584 |
| 17 | −11.843 | 0.10 | | | | 0.0013 | |
| 18 | −20.276 | 1.00 | Silica | L9 | P6 | | 1.028 |
| 19 | 14.645 | 0.30 | | | | 0.0040 | |
| 20 | 15.060 | 5.71 | Calcium fluorite | L10 | | | |
| 21 | −14.276 | 0.10 | | | | | |
| 22 | −296.265 | 1.00 | Silica | L11 | P7 | | 1.016 |
| 23 | 9.078 | 0.22 | | | | 0.0029 | |
| 24 | 9.221 | 5.72 | Calcium fluorite | L12 | P8 | | 1.057 |
| 25 | −13.321 | 0.30 | | | | 0.0040 | |
| 26 | −12.604 | 0.96 | Silica | L13 | | | |
| 27 | −75.401 | 0.11 | | | | | |
| 28 | 12.569 | 1.21 | Silica | L14 | P9 | | 1.248 |
| 29 | 5.957 | 0.84 | | | | 0.0111 | |
| 30 | 7.437 | 3.15 | Calcium fluorite | L15 | | | |

-continued

| | | | | |
|---|---|---|---|---|
| 31 | −67.082 | 0.11 | | |
| 32 | 8.440 | 2.19 | Calcium fluorite | L16 |
| 33 | 18.153 | 0.12 | | |
| 34 | 4.761 | 2.28 | Calcium fluorite | L17 |
| 35 | 7.583 | 0.10 | | |
| 36 | 2.617 | 2.21 | Silica | L18 |
| 37 | 8.399 | 0.49 | | |
| 38 | INFINITY | | | |

| Wavelength used for AF | Image-forming displacement between 248 nm and each wavelength used for AF at the best position of wavefront aberration on the object side |
|---|---|
| 670 nm | +9.03 μm |
| 785 nm | +0.92 μm |
| 900 nm | −7.76 μm |

In addition, in each embodiment, for calculating the conditional expression (1), L=45 mm for the first to third embodiments, L=60 mm for the fourth embodiment, and L=75 mm for the fifth and sixth embodiments are used. Thus, as for the range L, 45 mm≦L≦75 mm is suitable. However, there is no problem even when the range is 30 mm≦L≦105 mm.

As is apparent from the above description, in the objective lens according to the present invention, lenses made from materials different from each other are configured without using an adhesive, so that the problems due to the adhesive can be entirely solved while several kinds of aberration including chromatic aberration can be excellently corrected, and moreover, a high-resolution objective lens for deep ultra-violet light with a numeral aperture of 0.9 or more enabling to perform AF can be achieved.

Seventh Embodiment

Figure 14:
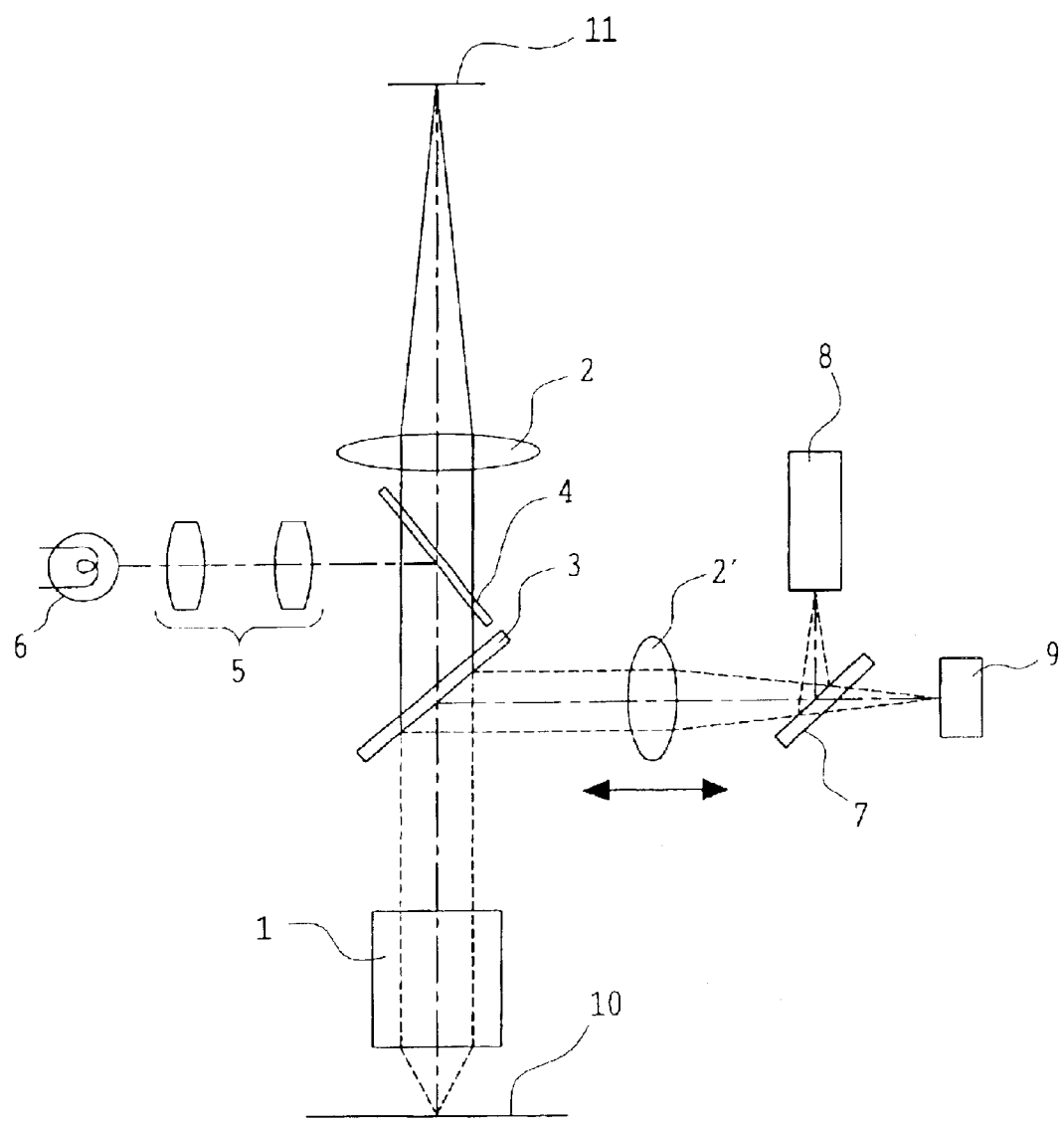
FIG. 14 is a schematic structural drawing of an embodiment of an optical apparatus having the objective lens according to the present invention.

FIG. 14 is a schematic structural drawing of an embodiment of an optical apparatus having the objective lens according to the present invention. In the drawing, numeral 1 denotes the objective lens; numeral 2 denotes a first image-forming lens; numeral 2' denotes a second image-forming lens; numeral 3 denotes a dichroic mirror; numeral 4 denotes a first half mirror; numeral 5 denotes an illumination lens; numeral 6 denotes a first light source; numeral 7 denotes a second half mirror; numeral 8 denotes a second light source; numeral 9 denotes a photodiode; numeral 10 denotes a specimen; and numeral 11 denotes a specimen image position.

According to the embodiment, the objective lens 1 and the image-forming lens 2 configure an observation optical system. Also, the first half mirror 4, the light source 6 and the illumination lens 5 configure an illumination optical system. Also, the dichroic mirror 3, the second image-forming lens 2', the second half mirror 7, the second light source 8, and the photodiode 9 configure an AF (auto-focus) optical system.

For the observation by deep ultra-violet light, the first light source 6 and the illumination lens 5 produce light with a wavelength in a deep ultra-violet region. If the light source 6 simultaneously generates light in a wavelength region other than the deep ultra-violet region, a wavelength selection element is arranged between the first light source 6 and the illumination lens 5. The deep ultra-violet light generated from the first light source 6 passes through the illumination lens 5 so as to reach the first half mirror 4. The deep ultra-violet light is reflected by the half mirror 4 so as to proceed toward the objective lens 1.

On the other hand, the second light source 8, which is an infrared semiconductor laser, for example, generates infrared light. The infrared light is reflected by the second half mirror 7 so as to pass through the second image-forming lens 2', and then it is reflected by the dichroic mirror 3 so as to proceed toward the objective lens 1.

As a result, the deep ultra-violet light and the infrared light enter the objective lens 1 simultaneously. Since the aberration is preferably corrected for the deep ultra-violet light and the infrared light here, the deep ultra-violet light reflected by the specimen 10 forms preferable deep ultra-violet light images at the specimen image position 11, while the infrared light reflected by the specimen 10 forms a preferable spot on the photodiode 9.

Also, in the objective lens 1, the difference between the object-side image-forming positions by wavelengths in the deep ultra-violet region and the infrared region is restrained within 12 μm, so that preferable spot images can be formed on the photodiode 9 by moving the second image-forming lens 2' along the optical axial direction.

Thus, the optical apparatus according to the embodiment has the objective lens with aberration preferably corrected for not only deep ultra-violet light but also infrared light, so that in-focus images with higher resolution can be obtained.

What is claimed is:

1. An objective lens having an NA of at least 0.7 and being constituted by combining a plurality of single lenses as a whole, the objective lens comprising:
   a first lens group having a positive meniscus lens with a convex surface facing an image side and a negative biconcave lens, which are arranged in the sequential order from the image side, so as to have negative refractive power as a whole;
   a second lens group having positive refractive power as a whole, lenses in the second lens group forming at least one lens pair that has a positive lens and a negative lens, which are made of media different from each other, with an air gap therebetween, a positive refractive power surface and a negative refractive power surface being arranged to face each other via the air gap;
   a third lens group having positive refractive power as a whole, lenses in the third lens group forming four lens pairs, each pair having a positive lens and a negative lens, which are made of media different from each other, with an air gap therebetween, a positive refractive power surface and a negative refractive power surface being arranged to face each other via the air gap;
   a fourth lens group having, lenses in the fourth lens group forming two lens pairs, each lens pair having a positive lens and a negative lens, which are made of media different from each other with an air gap therebetween, a positive refractive power surface and a negative refractive power surface being arranged to face each other via the air gap;
   a fifth lens group comprising a negative meniscus lens with a concave surface facing an object side, and having positive refractive power as a whole, lenses in the fifth lens group forming a lens pair that has a positive lens and a negative lens, which are made of media different from each other, with an air gap therebetween, a positive refractive power surface and a negative refractive power surface being arranged to face each other via the air gap; and
   a sixth lens group having at least one positive lens and a positive meniscus lens with a concave surface facing the object side so as to have positive refractive power as whole, wherein each of the lens pairs formed in the objective lens satisfies the following conditional expressions:

$$d/L < 0.025$$

$$0.580 < Rp/Rn < 1.65$$

where L(mm) is the overall length of the objective lens; d(mm) is the air gap inside the lens pair; and Rp and Rn are the radii of curvature of the positive refractive power surface and the negative refractive power surface facing each other via the air gap, respectively, and wherein the objective lens satisfies the following conditional expression:

$$|DUVfp - IRfp| \leq 12 \, \mu m,$$

where DUVfp is the image-forming position on an object side of the objective lens by light having a wavelength in a deep ultra-violet region and IRfp is the image-forming position on the object side of the objective lens by light having a wavelength in an infrared region.

2. An objective lens according to claim 1, wherein the objective lens has a lens made from silica and a lens made from calcium fluorite.

3. An objective lens according to claim 1, wherein in at least one of the lens pairs of the second lens group, the negative lens is constituted of a lens made from silica and the positive lens is constituted of a lens made from calcium fluorite.

4. An objective lens according to claim 1, wherein in at least one of the lens pairs of the third lens group, the negative lens is constituted of a lens made from silica and the positive lens is constituted of a lens made from calcium fluorite.

5. An objective lens according to claim 1 or 2, wherein in at east one of the lens pairs of the fourth lens group, the negative lens is constituted of a lens made from silica and the positive lens is constituted of a lens made from calcium fluorite.

6. An objective lens according to claim 1 or 2, wherein in at east one of the lens pairs of the fifth lens group, the negative lens is constituted of a lens made from silica and the positive lens is constituted of a lens made from calcium fluorite.

7. An objective lens according to claim 1, wherein in one lens pair of each of the second lens group, the third lens group, the fourth lens group, and the fifth lens group, the negative lens is constituted of a lens made from silica and the positive lens is constituted of a lens made from calcium fluorite.

8. An objective lens according to claim 1, wherein the second lens group has a concave lens and satisfies the following conditional expression:

$$Ri < Ro,$$

where Ri is the curvature of at least one concave lens on an image side and Ro is the curvature thereof on an object side.

9. An objective lens according to claim 1, wherein a parfocal distance is from 30 mm to 105 mm.

10. An objective lens according to claim 1, wherein a parfocal distance is from 45 mm to 75 mm.

11. An objective lens according to claim 1, wherein the sum total of central thicknesses of lenses constituting the first lens group is smaller than the space between the first lens group and the second lens group.

12. An objective lens according to claim 1, wherein the aberration is corrected within a range of ±5 nm for a wavelength of a deep ultra-violet region.

13. An objective lens having an NA of at least 0.7 and being constituted by combining a plurality of single lenses as a whole, the objective lens comprising:

a first lens group having a positive meniscus lens with a convex surface facing an image side and a negative biconcave lens, which are arranged in the sequential order from the image side, so as to have negative refractive power as a whole;

a second lens group having positive refractive power as a whole, lenses in the second lens group forming at least one lens pair that has a positive lens and a negative lens, which are made of media different from each other, with an air gap therebetween, a positive refractive power surface and a negative refractive power surface being arranged to face each other via the air gap;

a third lens group having positive refractive power as a whole, lenses in the third lens group forming two lens triads, each lens triad having three lenses with two air gaps therebetween, the three lenses at least including a positive lens and a negative lens which are made of media different from each other, a positive refractive power surface and a negative refractive power surface being arranged to face each other via each of the air gaps;

a fourth lens group, lenses in the fourth lens group forming two lens pairs, each said lens pair having a positive lens and a negative lens, which are made of media different from each other, with an air gap therebetween, a positive refractive power surface and a negative refractive power surface being arranged to face each other via the air gap;

a fifth lens group comprising a negative meniscus lens with a concave surface facing an object side, and having positive refractive power as a whole, lenses in the fifth lens group forming a lens pair that has a positive lens and a negative lens, which are made of media different from each other, with an air gap therebetween, a positive refractive power surface and a negative refractive power surface being arranged to face each other via the air gap; and a sixth lens group having at least one positive lens and a positive meniscus lens with a concave surface facing the object side so as to have positive refractive power as whole, wherein each of the lens pairs and the lens triads formed in the objective lens satisfies the following conditional expressions:

$$d/L < 0.025$$

$$0.58 < Rp/Rn < 1.65$$

where L(mm) is the overall length of the objective lens; d(mm) is each air gap inside the lens pair or the lens triad; and Rp and Rn are the radii of curvature of the positive refractive power surface and the negative refractive power surface facing each other via the air gap, respectively, and wherein the objective lens satisfies the following conditional expression $$|DUVfp - IRfp| \leq 12 \,\mu m,$$

where DUVfp is the image-forming position on an object side of the objective lens by light having a wavelength in a dew ultra-violet region and IRfp is the image-forming position on the object side of the objective lens by light having a wavelength in an infrared region.

14. An optical apparatus comprising:

an objective lens;

a first illumination unit comprising a light source generating ultra-violet light and an illumination optical system leading the ultra-violet light to the objective lens; and a second illumination unit comprising a light source generating infrared light and an illumination optical system leading the infrared light to the objective lens, wherein a specimen is illuminated with the ultra-violet light and the infrared light through the objective lens, wherein in the objective lens having an NA of at least 0.7 and being constituted by combining a plurality of single lenses as a whole, the objective lens comprises:

a first lens group having a positive meniscus lens with a convex surface facing an image side and a negative biconcave lens, which are arranged in the sequential order from the image side, so as to have negative refractive power as a whole;

a second lens group having positive refractive power as a whole, lenses in the second lens group forming at leas one lens pair that has a positive lens and a negative lens, which are made of media different from each other, with an air gap therebetween, a positive refractive power surface and a negative refractive power surface being arranged to face each other via the air gap;

a third lens group having positive refractive power as a whole, lenses in the third lens group forming four lens pairs, each lens pair having a positive lens and a negative lens, which are made of media different from each other, with an air gap therebetween, a positive refractive power surface and a negative refractive power surface being arranged to face each other via the air gap;

a fourth lens group, lenses in the fourth lens group forming two lens pairs, each lens pair having a positive lens and a negative lens, which are made of media different from each other, with an air gap therebetween, a positive refractive power surface and a negative refractive power surface being arranged to face each other via the air gap;

a fifth lens group comprising a negative meniscus lens with a concave surface facing an object side, and having positive refractive power as a whole, lenses in the fifth lens group forming a lens pair that has a positive lens and a negative lens, which are made of media different from each other, with an air gap therebetween, a positive refractive power surface and a negative refractive power surface being arranged to face each other via the air gap; and a sixth lens group having at least one positive lens and a positive meniscus lens with a concave surface facing the object side so as to have positive refractive power as whole, wherein each of the lens pairs formed in the objective lens satisfies the following conditional expressions:

$$d/L < 0.025$$

$$0.58 < Rp/Rn < 1.65$$

where L(mm) is the overall length of the objective lens; d(mm) is the air gap inside the lens pair; and Rp and Rn are the radii of curvature of the positive refractive power surface and the negative refractive power surface facing each other via the air gap, respectively, and wherein the objective lens satisfies the following conditional expression:

$|DUVfp - IRfp| < 12 \,\mu m$, where DUVfp is the image-forming position on an object side of the objective lens by light having a wavelength in a deep ultra-violet region and IRfp is the image-forming position on the object side of the objective lens by light having a wavelength in an infrared region.

* * * * *